US012669729B2

(12) United States Patent
Kim et al.

(10) Patent No.: US 12,669,729 B2
(45) Date of Patent: Jun. 30, 2026

(54) DISPLAY DEVICE INCLUDING A LIGHT PATH CONTROL LAYER AND A MANUFACTURING METHOD OF THE SAME

(71) Applicant: SAMSUNG DISPLAY CO., LTD., Yongin-si (KR)

(72) Inventors: Taeho Kim, Yongin-si (KR); Ohjeong Kwon, Yongin-si (KR); Daewon Kim, Yongin-si (KR); Jongho Son, Yongin-si (KR); Mihwa Lee, Yongin-si (KR); Sunggyu Jang, Yongin-si (KR); Seungyeon Jeong, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/922,531

(22) Filed: Oct. 22, 2024

(65) Prior Publication Data

US 2025/0264760 A1     Aug. 21, 2025

(30) Foreign Application Priority Data

Feb. 16, 2024     (KR) ........................ 10-2024-0022802

(51) Int. Cl.
| | |
|---|---|
| *G02F 1/1335* | (2006.01) |
| *G02F 1/1334* | (2006.01) |
| *G02F 1/1343* | (2006.01) |

(52) U.S. Cl.
CPC ...... *G02F 1/133607* (2021.01); *G02F 1/1334* (2013.01); *G02F 1/134336* (2013.01); *G02F 1/13439* (2013.01)

(58) Field of Classification Search
CPC ............ G02F 1/133607; G02F 1/1334; G02F 1/134336; G02F 1/13439
See application file for complete search history.

(56) References Cited

U.S. PATENT DOCUMENTS

| | | | |
|---|---|---|---|
| 9,229,261 B2 | 1/2016 | Schwartz et al. | |
| 11,200,855 B2 | 12/2021 | Fattal | |
| 2020/0083222 A1 * | 3/2020 | Kim ................... | H10D 84/0193 |
| 2021/0263612 A1 * | 8/2021 | Shinohara ............... | G02B 6/10 |
| 2023/0367056 A1 * | 11/2023 | Nakamura ........ | G02F 1/133616 |

FOREIGN PATENT DOCUMENTS

| | | | | |
|---|---|---|---|---|
| CN | 118210168 A * | 6/2024 | ....... | G02F 1/133607 |
| KR | 10-2007-0058256 A | 6/2007 | | |
| KR | 10-2014-0085465 A | 7/2014 | | |

* cited by examiner

*Primary Examiner* — Lucy P Chien

(74) *Attorney, Agent, or Firm* — F. CHAU & ASSOCIATES, LLC

(57) ABSTRACT

A display device includes: a light-emitting element layer including a light-emitting region and a non-light-emitting region adjacent to the light-emitting region; and a light-path control layer disposed on the light-emitting element layer, and configured to control a path of light that is provided from the light-emitting element layer, wherein the light-path control layer includes a control pattern that overlaps the non-light-emitting region and does not overlap the light-emitting region, wherein the control pattern includes a polymer and liquid crystal molecules that are dispersed within the polymer.

20 Claims, 21 Drawing Sheets

DISPLAY DEVICE INCLUDING A LIGHT PATH CONTROL LAYER AND A MANUFACTURING METHOD OF THE SAME

CROSS-REFERENCE TO RELATED APPLICATION

This U.S. non-provisional patent application claims priority under 35 U.S.C. § 119 to Korean Patent Application No. 10-2024-0022802, filed on Feb. 16, 2024, the disclosure of which is incorporated by reference herein in its entirety.

TECHNICAL FIELD

Embodiments of present inventive concept relate to a display device and a manufacturing method of the same, and more particularly, to a display device including a light path control layer, and a manufacturing method of the same.

DISCUSSION OF THE RELATED ART

Display devices used for various apparatuses, such as a television, a mobile phone, a tablet computer, and a vehicle, are currently under development. Currently, display devices are under development, at least, to address the user environment where information protection and privacy is desirable and to address safety regulations that limit the viewing angle of the display device. Therefore, research on the limitation of viewing angle is in progress and display devices are under further development.

SUMMARY

According to an embodiment of the present inventive concept, a display device includes: a light-emitting element layer including a light-emitting region and a non-light-emitting region adjacent to the light-emitting region; and a light-path control layer disposed on the light-emitting element layer, and configured to control a path of light that is provided from the light-emitting element layer, wherein the light-path control layer includes a control pattern that overlaps the non-light-emitting region and does not overlap the light-emitting region, wherein the control pattern includes a polymer and liquid crystal molecules that are dispersed within the polymer.

In an embodiment of the present inventive concept, the control pattern includes a first control pattern and a second control pattern that are spaced apart from each other with the light-emitting region therebetween.

In an embodiment of the present inventive concept, the light-path control layer further includes: a filling pattern disposed between the first control pattern and the second control pattern; and an overcoat layer disposed on the first control pattern, the second control pattern, and the filling pattern.

In an embodiment of the present inventive concept, the filling pattern is in contact with each of a side surface of the first control pattern and a side surface of the second control pattern.

In an embodiment of the present inventive concept, an upper surface of the first control pattern, an upper surface of the second control pattern, and an upper surface of the filling pattern are substantially coplanar.

In an embodiment of the present inventive concept, a distance between the first control pattern and the second control pattern is substantially equal to a width of the light-emitting region.

In an embodiment of the present inventive concept, the light-path control layer further includes a first transparent electrode disposed on the control pattern, and a second transparent electrode spaced apart from the first transparent electrode in a thickness direction with the control pattern disposed therebetween.

In an embodiment of the present inventive concept, the display device is configured to operate selectively in a first mode or a second mode, in the first mode, a first voltage is applied to the first transparent electrode and the second transparent electrode, and in the second mode, the first voltage is not applied to the first transparent electrode and the second transparent electrode.

In an embodiment of the present inventive concept, in the first mode, the control pattern transmits the light provided from the light-emitting element layer, and in the second mode, the control pattern scatters the light provided from the light-emitting element layer.

In an embodiment of the present inventive concept, the first transparent electrode includes a (1-1)-th sub electrode and a (1-2)-th sub electrode that are spaced apart from each other, and the second transparent electrode includes a (2-1)-th sub electrode, which overlaps the (1-1)-th sub electrode, and a (2-2)-th sub electrode, which overlaps the (1-2)-th sub electrode.

In an embodiment of the present inventive concept, the display device is configured to operate selectively in one of a first mode, a second mode, or a third mode, in the first mode, a first voltage is applied to the (1-1)-th sub electrode and the (2-1)-th sub electrode, and a second voltage is applied to the (1-2)-th sub electrode and the (2-2)-th sub electrode, in the second mode, the first voltage is applied to the (1-1)-th sub electrode and the (2-1)-th sub electrode, and the second voltage is not applied to the (1-2)-th sub electrode and the (2-2)-th sub electrode, and in the third mode, the first voltage is not applied to the (1-1)-th sub electrode and the (2-1)-th sub electrode, and the second voltage is not applied to the (1-2)-th sub electrode and the (2-2)-th sub electrode.

In an embodiment of the present inventive concept, the control pattern includes a first part, which overlaps the (1-1)-th sub electrode, and a second part, which overlaps the (1-2)-th sub electrode, and the first part and the second part have an integrated shape.

In an embodiment of the present inventive concept, the light-emitting element layer includes: a pixel-defining layer including a pixel opening that defines the light-emitting region; and a light-emitting layer at least partially disposed in the pixel opening and configured to provide the light, wherein the control pattern overlaps the pixel-defining layer.

In an embodiment of the present inventive concept, the light-emitting region includes a first light-emitting region configured to emit light of a first wavelength, a second light-emitting region configured to emit light of a second wavelength that is different from the first wavelength, and a third light-emitting region configured to emit light of a third wavelength that is different from each of the first wavelength and the second wavelength, and the control pattern overlaps each of a portion between the first light-emitting region and the second light-emitting region and a portion between the second light-emitting region and the third light-emitting region.

In an embodiment of the present inventive concept, the display device further includes an input sensor disposed between the light-path control layer and the light-emitting element layer.

In an embodiment of the present inventive concept, the light-path control layer is directly disposed on the input sensor.

According to an embodiment of the present inventive concept, a display device includes: a light-emitting element layer including a light-emitting region and a non-light-emitting region at least partially surrounding the light-emitting region; and a light-path control layer disposed on the light-emitting element layer, and configured to control a path of light that is provided from the light-emitting element layer, wherein the light-path control layer includes: a first transparent electrode disposed on the light-emitting element layer; a control pattern disposed on the first transparent electrode, and including a polymer and liquid crystal molecules that are dispersed within the polymer; and a second transparent electrode spaced apart from the first transparent electrode in a thickness direction with the control pattern disposed therebetween, wherein the first transparent electrode includes a (1-1)-th sub electrode and a (1-2)-th sub electrode that are spaced apart from each other, and the second transparent electrode includes a (2-1)-th sub electrode, which overlaps the (1-1)-th sub electrode, and a (2-2)-th sub electrode, which overlaps the (1-2)-th sub electrode.

In an embodiment of the present inventive concept, the control pattern includes a first part, which overlaps the (1-1)-th sub electrode, and a second part, which overlaps the (1-2)-th sub electrode, and the first part and the second part have an integrated shape.

According to an embodiment of the present inventive concept, a manufacturing method of a display device includes: forming a light-emitting element layer; and forming a light-path control layer on the light-emitting element layer, wherein the forming of the light-path control layer includes: forming a first preliminary transparent layer through a conductive material; providing a polymer, in which liquid crystal molecules are dispersed, onto the first preliminary transparent layer to form a preliminary partitioning layer; patterning the first preliminary transparent layer and the preliminary partitioning layer to form a first transparent electrode and a control pattern; providing an organic material onto the control pattern to form a preliminary organic layer; polishing the preliminary organic layer to form a filling pattern; forming a second transparent electrode on the control pattern through a conductive material; and forming an overcoat layer covering the second transparent electrode and the filling pattern.

In an embodiment of the present inventive concept, in the forming of the filling pattern, an upper surface of each of the control pattern and the filling pattern is planarized by the polishing.

BRIEF DESCRIPTION OF THE FIGURES

The above and other features of the present inventive concept will become apparent by describing in detail embodiments thereof with reference to the accompanying drawings, in which:

FIG. 8 is a cross-sectional view of a display device according to an embodiment of the present inventive concept;

FIG. 10 is a cross-sectional view of a display device according to an embodiment of the present inventive concept;

FIG. 11 is a cross-sectional view of a display device, according to an embodiment of the present inventive concept, which operates in a second mode;

DETAILED DESCRIPTION OF THE EMBODIMENTS

Figure 1A:
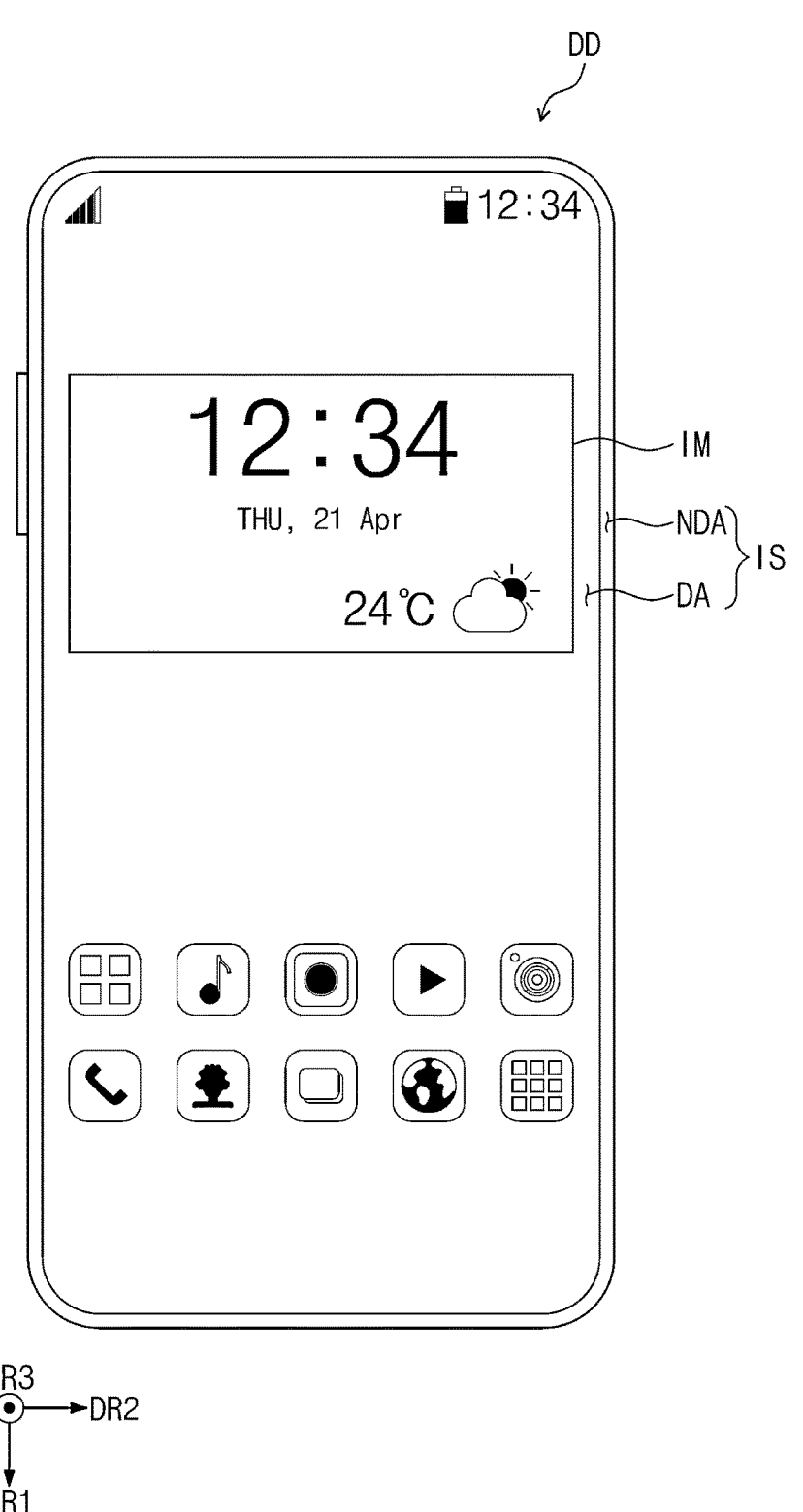
FIG. 1A is a front view of a display device according to an embodiment of the present inventive concept.

In this specification, it will be understood that when an element (or a region, a layer, a portion, or the like) is referred to as being "on", "connected to" or "coupled to" another element, it may be directly disposed on, connected or coupled to the other element, or intervening elements may be interposed therebetween.

In addition, in this specification, the term "directly disposed" may mean there is no intervening layer, film, region, substrate, or the like between one layer, film, region, substrate, or the like and another layer, film, region, substrate, or the like. For example, the term "directly disposed" may refer to two layers or two members being disposed on each other without using an additional member such as an adhesion member.

Like reference numerals or symbols may refer to like elements throughout the specification and drawings. In addition, various thicknesses, lengths, and angles are shown and while the arrangement shown does indeed represent an embodiment of the present inventive concept, it is to be understood that modifications of the various thicknesses, lengths, and angles may be possible within the spirit and scope of the present disclosure and the present disclosure is not necessarily limited to the particular thicknesses, lengths, and angles shown As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the spirit and scope of the present inventive concept. Similarly, a second element, component, region, layer or section may be termed a first element, component, region, layer or section. As used herein, the terms of a singular form may include a plural form unless the context clearly indicates otherwise.

Also, terms such as "below," "lower," "above," and "upper" may be used to describe the relationships of the components illustrated in the drawings. These terms are used as a spatially relative concept and are described based on the directions indicated in the drawings. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, embodiments of the present inventive concept will be described with reference to the accompanying drawings.

Figure 1B:
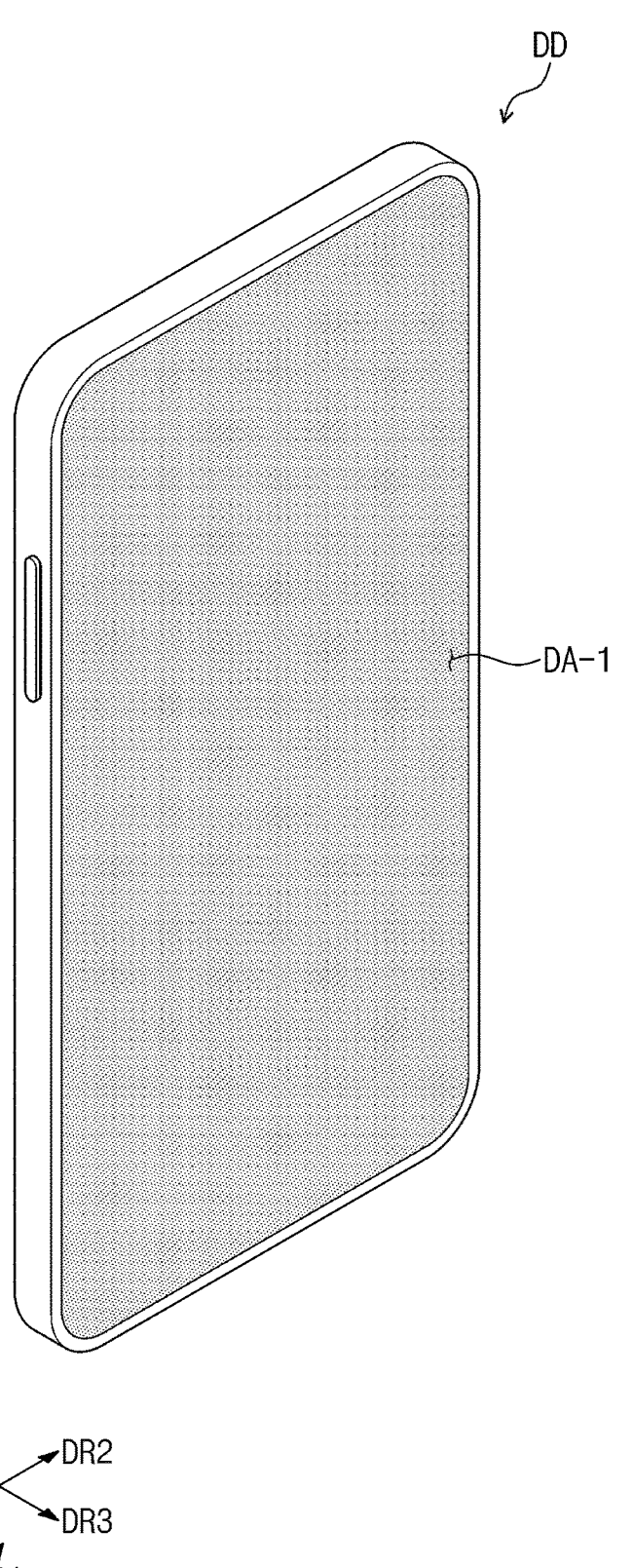
FIG. 1B is a perspective view of a display device according to an embodiment of the present inventive concept.

FIG. 1A is a front view of a display device DD according to an embodiment of the present inventive concept. FIG. 1B is a perspective view of the display device DD according to an embodiment of the present inventive concept.

Referring to FIGS. 1A and 1B, the display device DD may be activated in response to electrical signals. The display device DD may be applied to an electronic apparatus such as a mobile phone, a tablet computer, a smart watch, a laptop computer, a computer, and a smart television.

The display device DD may display an image on a display surface IS that is parallel to each of a first direction DR1 and a second direction DR2 that crosses the first direction DR1. The display surface IS on which the image is displayed may correspond to a front surface of the display device DD. The image may include a still image as well as a dynamic image. The normal direction of the display surface IS, which is the thickness direction of the display device DD, is indicated by a third direction DR3. A front surface (or, e.g., an upper surface) and a rear surface (or, e.g., a lower surface) of each of layers or units described hereinafter are distinguished on the basis of the third direction DR3.

The display surface IS of the display device DD may be divided into a display region DA and a non-display region NDA. The display region DA may be a region where the image is displayed. A user views the image through the display region DA. In this embodiment, the display region DA is illustrated as a rectangle with rounded corners. However, this is an example. For example, the display region DA may have various shapes, and is not limited to any one embodiment of the present inventive concept.

The non-display region NDA is adjacent to the display region DA. The non-display region NDA may have a predetermined color. The non-display region NDA may at least partially surround the display region DA. Accordingly, the shape of the display region DA may be substantially defined by the non-display region NDA. However, this is an example, and the non-display region NDA may be disposed adjacent to only one side of the display region DA, or may also be omitted. The display device DD according to an embodiment of the present inventive concept may include various embodiments, and is not limited to any one embodiment of the present inventive concept.

FIG. 1A may be a front view of the display device DD which operates in a first mode or a second mode. FIG. 1B may be a side-surface perspective view of the display device DD that is operating in the second mode. For example, the first mode may be a general mode where a screen is displayed at a first viewing angle, and the second mode may be a viewing-angle control mode where the screen is displayed at a second viewing angle that is narrower than the first viewing angle. The second mode may be referred to as a privacy mode, a privacy protection mode, etc. The first viewing angle and the second viewing angle may be defined as angels at which a picture may be viewed without distortion with respect to the normal direction of the display surface IS.

Referring to FIG. 1A, in the first mode or the second mode, when the display device DD is viewed from the front (or, in a direction parallel to the normal direction or the third direction DR3), images IM that are generated from the display device DD may be viewed by a user. In the second mode, when the display device DD is viewed at an angle that is greater than the second viewing angle, the images IM might not be viewed. For reference, when the display device DD is viewed at an angle greater than the second viewing angle in the first mode, the user may view the images IM.

The second viewing angle in the second mode and the brightness at the second viewing angle may be variously set. For example, the second viewing angle may be about 45 degrees, and the brightness at about 45 degrees may be about 10% of the maximum brightness, but an embodiment of the present inventive concept is not particularly limited thereto.

The display device DD may operate selectively in any one among the first mode where the screen is displayed at the first viewing angle or the second mode where the screen is displayed at the second viewing angle that is narrower than the first viewing angle. Transition between the first mode and the second mode may be set by the user, or the transition from the first mode to the second mode may be made when a particular application is executed. For example, when an application is executed and there is a risk of personal information being exposed, such as a banking or memo application, the display device DD may switch from the first mode to the second mode.

Figure 2A:
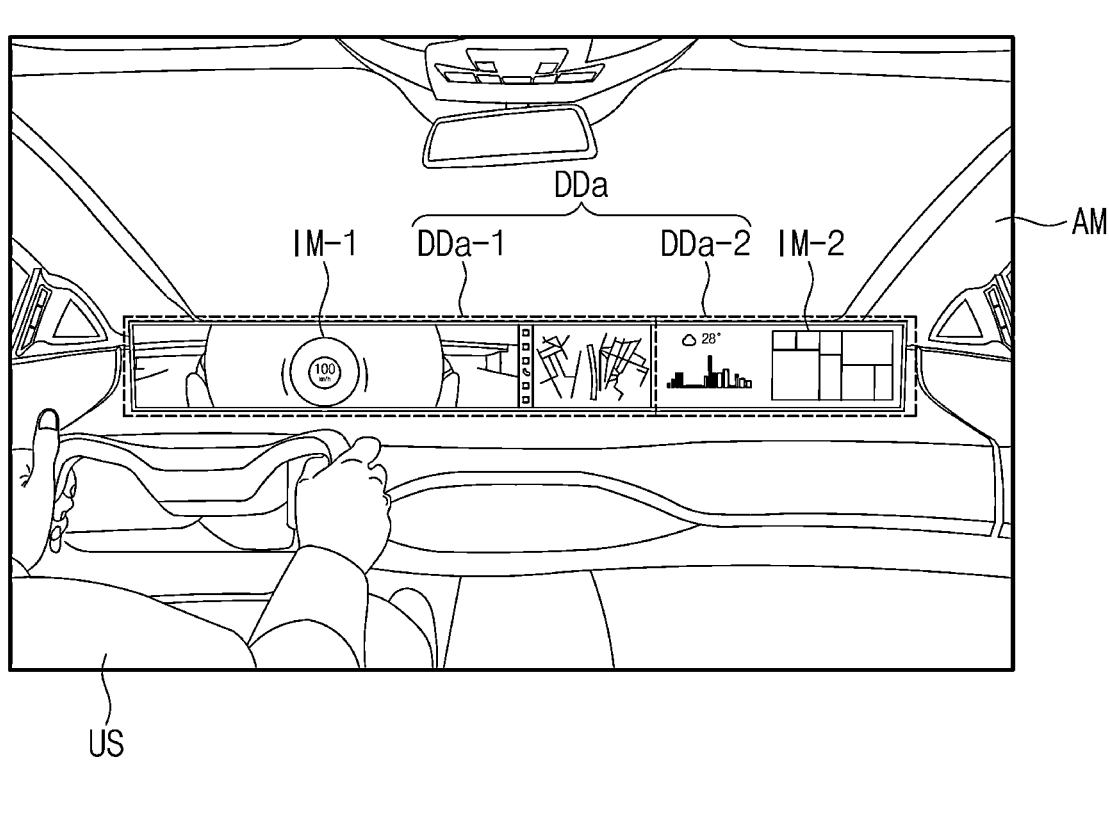
FIG. 2A is a drawing illustrating an interior of a vehicle where a display device, according to an embodiment of the present inventive concept, is disposed.
Figure 2A:
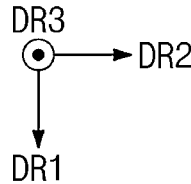
Figure 2B:
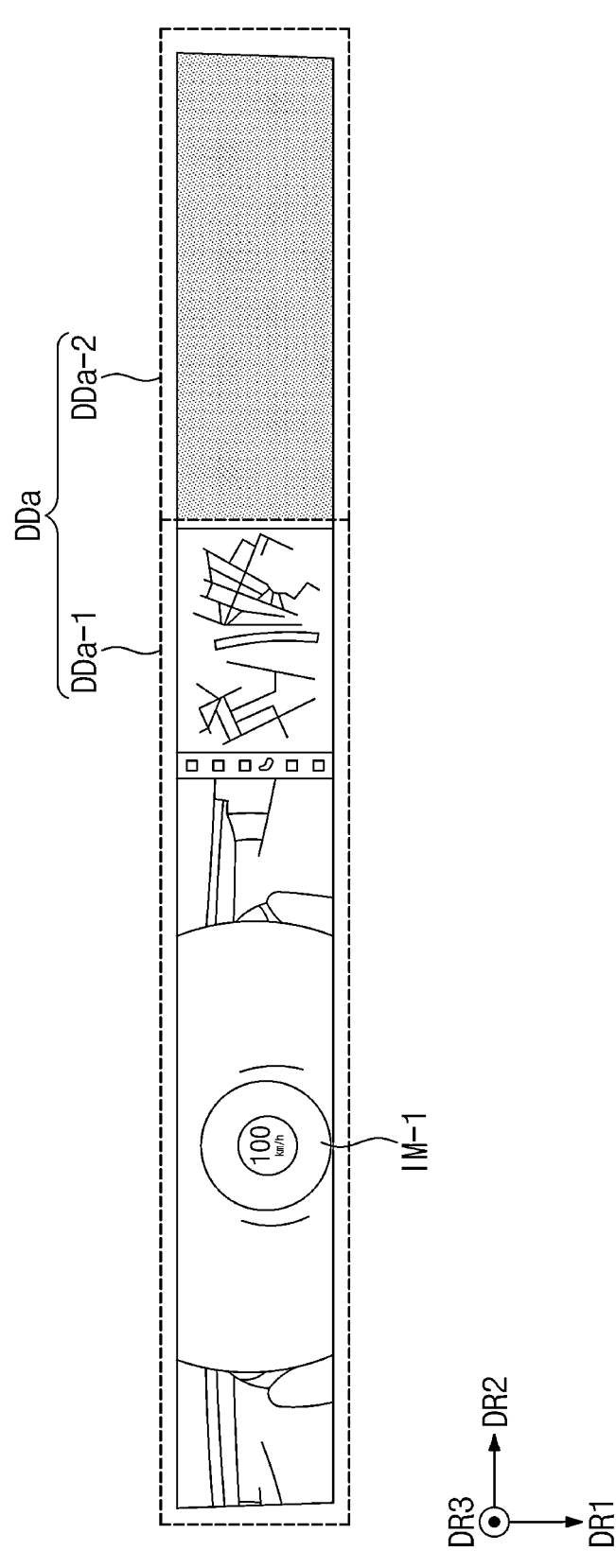
FIG. 2B is a drawing illustrating an image viewed from a driver's seat when a display device, according to an embodiment of the present inventive concept, operates in a second mode.

FIG. 2A is a drawing illustrating an interior of a vehicle AM where a display device DDa, according to an embodiment of the present inventive concept, is disposed. FIG. 2B is a drawing illustrating an image visible from a driver's seat when the display device DDa, according to an embodiment of the present inventive concept, operates in a second mode.

Referring to FIG. 2A, the display device DDa may be disposed inside the vehicle AM. The display device DDa may be disposed inside the vehicle AM to provide various information to a driver US. The display device DDa may include a first display device DDa-1 and a second display device DDa-2. The first display device DDa-1 may provide a first image IM-1 for driving to the driver US. The second display device DDa-2 may be disposed at a position facing a passenger seat, and the second display device DDa-2 may provide a second image IM-2. For example, the first image IM-1 may display information on speed, vehicle condition, vehicle internal manipulation, and navigation, etc., and the second image IM-2 may display not only information for driving, but also various information unrelated to the driving.

According to an embodiment of the present inventive concept, the first display device DDa-1 and the second display device DDa-2 may be display devices that are independent of each other, and may also be one display device including one panel. In case of the display devices that are independent of each other, the first display device DDa-1 might not include operation of controlling the viewing angle, and the second display device DDa-2 may operate in a first mode or a second mode. In case of the first display device DDa-1 and the second display device DDa-2 being one display device DDa, both of the first display device DDa-1 and the second display device DDa-2 may operate in the first mode or in the second mode. In addition, only the second display device DDa-2 may partially operate in the first mode or second mode.

The first mode may be a general mode where a screen is displayed at a first viewing angle, and the second mode may be a viewing-angle control mode where the screen is displayed at a second viewing angle that is narrower than the first viewing angle. The second viewing angle in the second mode and the brightness at the second viewing angle may be variously set. For example, the second viewing angle and the brightness at the second viewing angle may be set in accordance with country-specific regulations in which the vehicle AM is operated. For example, the second viewing angle may be about 35 degrees, and the brightness at about 35 degrees may be about 0.75% of the maximum brightness, but an embodiment of the present inventive concept is not particularly limited thereto.

FIG. 2B illustrates the image visible to the driver US who is driving. The driver US may watch only the first image IM-1 which may be necessary for driving, and might not watch the second image IM-2 (see FIG. 2A), which may display unnecessary information for the driving, due to limitation of the viewing angle.

Transition between the first mode and the second mode may be determined according to whether the vehicle AM is running or stopped. For example, when the vehicle AM is running, at least the second display device DDa-2 may operate in the second mode. When the vehicle AM is stopped, the second display device DDa-2 may operate in the first mode. In addition, even though the vehicle AM is running, but is in an autonomous mode, the second display device DDa-2 may operate in the first mode. When the first mode is operated, the driver US may watch the first image IM-1 that is illustrated in FIG. 2A.

Figure 3A:
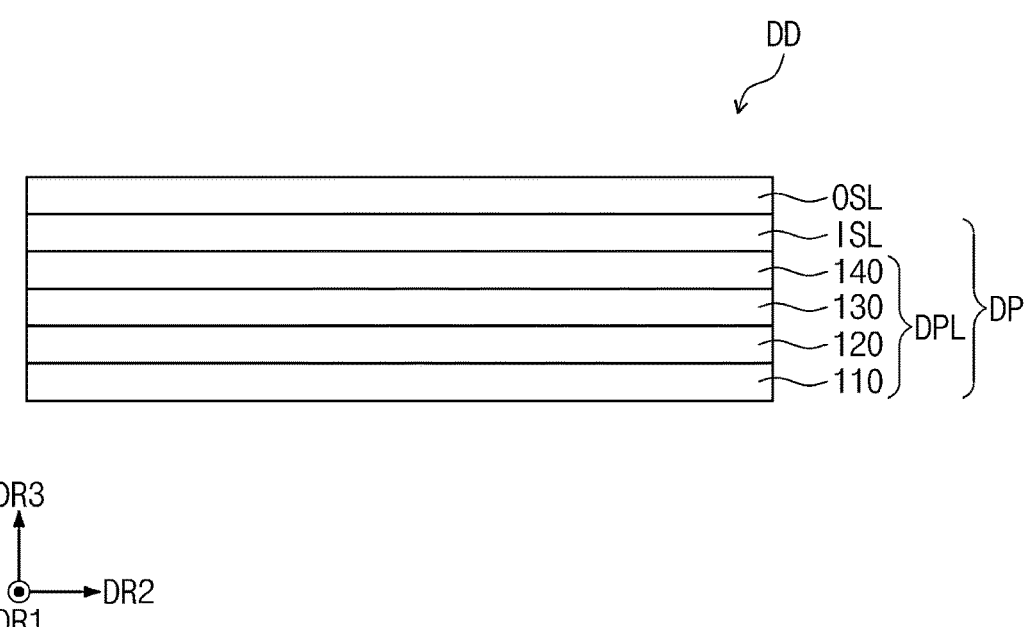
FIG. 3A is a cross-sectional view of a display device according to an embodiment of the present inventive concept.

FIG. 3A is a cross-sectional view of a display device DD according to an embodiment of the present inventive concept.

Referring to FIG. 3A, the display device DD may include a display panel DP and a light-path control layer OSL. A protection film, a window, or a functional coating layer, which provides a front surface of the display device DD, may be disposed on the light-path control layer OSL.

The display panel DP may include a display layer DPL and an input sensor ISL.

The display layer DPL may include a base layer 110, a circuit layer 120, a light-emitting element layer 130, and an encapsulation layer 140. The display layer DPL may be a component that generates an image. The display layer DPL may be an emission-type display layer, and for example, the display layer DPL may be an organic light-emitting display layer, an inorganic light-emitting display layer, an organic-inorganic light-emitting display layer, a quantum-dot display layer, a micro-LED display layer, or a nano-LED display layer.

The input sensor ISL may detect an external input applied from the outside. The external input may be a user's input. The user's input may include various types of external inputs such as a part of the user's body, light, heat, a pen, or pressure. The input sensor ISL may be referred to as a sensor, an input-sensing layer, or an input-sensing panel. The input sensor ISL may be formed through a continuous process with the display layer DPL to be disposed on the display layer DPL. For example, the input sensor ISL may be directly disposed on the display layer DPL. However, an embodiment of the present inventive concept is not particularly limited thereto. For example, the input sensor ISL may also be bonded to the display layer DPL through an adhesive layer.

The light-path control layer OSL may control a path of light provided from the display layer DPL. The light-path control layer OSL may include a structure for controlling the path of light. The light-path control layer OSL may be disposed on the input sensor ISL. The light-path control layer OSL may be formed through a continuous process with the display layer DPL and the input sensor ISL to be disposed on the input sensor ISL. For example, the light-path control layer OSL may be directly disposed on the input sensor ISL. However, an embodiment of the present inventive concept is not particularly limited thereto. For example, the light-path control layer OSL may be bonded to the input sensor ISL through an adhesive layer.

Figure 3B:
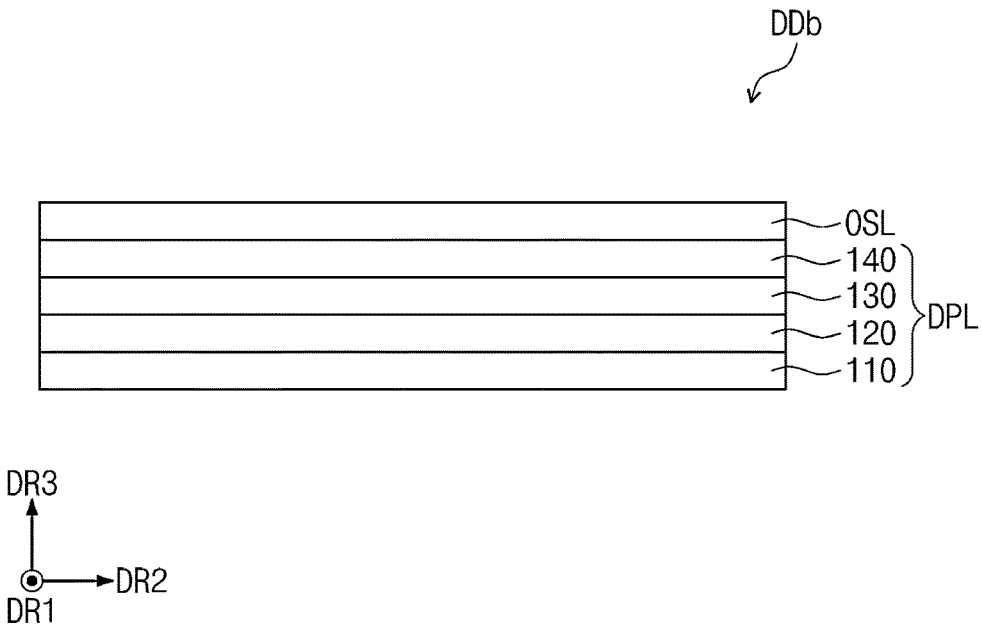
FIG. 3B is a cross-sectional view of a display device according to an embodiment of the present inventive concept.

FIG. 3B is a cross-sectional view of a display device DDb according to an embodiment of the present inventive concept.

Referring to FIG. 3B, the display device DDb may include a display layer DPL and a light-path control layer OSL. Compared to the illustration of FIG. 3A, the display device DDb might not include the input sensor ISL (see FIG. 3A). The light-path control layer OSL may be formed through a continuous process with the display layer DPL to be disposed on the display layer DPL. For example, the light-path control layer OSL may be directly disposed on display layer DPL. However, an embodiment of the present inventive concept is not particularly limited thereto.

Figure 4:
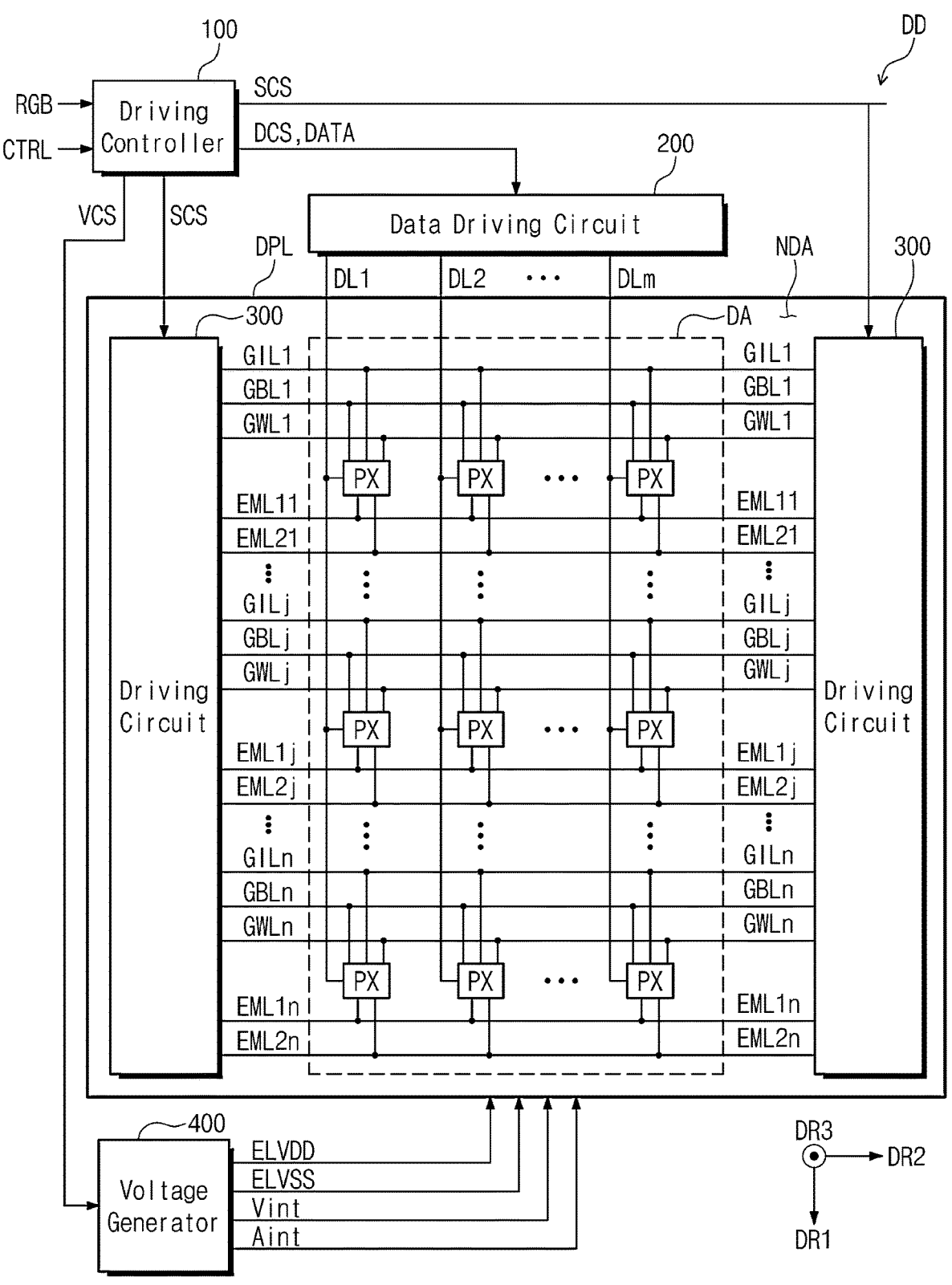
FIG. 4 is a block diagram of a display device according to an embodiment of the present inventive concept.

FIG. 4 is a block diagram of a display device DD according to an embodiment of the present inventive concept.

Referring to FIG. 4, the display device DD may further include a driving controller 100 and a panel driver for driving a display layer DPL. As an embodiment of the present inventive concept, the panel driver may include a data driving circuit 200 (or data driver), driving circuits 300, and a voltage generator 400.

The display layer DPL may include a display region DA and a non-display region NDA. The display layer DPL may include a plurality of pixels PX that are disposed in the display region DA. Each of the plurality of pixels PX includes a light-emitting element ED (see FIG. 7) and a pixel-driving circuit that controls emission of the light-emitting element ED. The pixel-driving circuit PXC may include at least one transistor and at least one capacitor.

The display layer DPL may further include initialization scan lines GIL1 to GILn, write scan lines GWL1 to GWLn, black scan lines GBL1 to GBLn, first emission control lines EML11 to EML1*n*, second emission control lines EML21 to EML2*n*, and data lines DL1 to DLm. According to an embodiment of the present inventive concept, the display layer DPL may further include other third emission control lines.

The driving controller 100 receives an image signal RGB and a control signal CTRL. The driving controller 100 generates an image data signal DATA in which the data format of the image signal RGB has been converted to have interface specifications in accordance with the data driving circuit 200. The driving controller 100 may output a first control signal SCS, a second control signal DCS, and a third control signal VCS.

The data driving circuit 200 receives the second control signal DCS and the image data signal DATA from the driving controller 100. The data driving circuit 200 converts the image data signal DATA into data signals, and outputs the data signals through the data lines DL1 to DLm. The data signals are analog voltages corresponding to a grayscale value of the image data signal DATA. The data lines DL1 to DLm may be arranged along a second direction DR2, and the data lines DL1 to DLm may each extend along a first direction DR1.

The driving circuit 300 may be disposed in the non-display region NDA of the display layer DPL, but an embodiment of the present inventive concept is not particularly limited thereto. For example, at least a portion of the driving circuit 300 may also be disposed in the display region DA. For example, the driving circuits 300 may include the transistors formed through the same process as that of the pixel-driving circuit PXC (see FIG. 14).

The driving circuit 300 may receive the first control signal SCS, and output a scan signal or an emission control signal through the initialization scan lines GIL1 to GILn, the write scan lines GWL1 to GWLn, the black scan lines GBL1 to GBLn, the first emission control lines EML11 to EML1*n*, and the second emission control lines EML21 to EML2*n*.

The driving circuit 300 may be provided in plurality. For example, the plurality of driving circuits 300 may be spaced apart from each other with the display region DA disposed therebetween. The initialization scan lines GIL1 to GILn, the write scan lines GWL1 to GWLn, the black scan lines GBL1 to GBLn, the first emission control lines EML11 to EML1*n*, and the second emission control lines EML21 to EML2*n* may each be electrically connected to the driving circuits 300 to receive signals from the driving circuits 300. For example, one initialization scan line GIL1, one write scan line GWL1, one black scan line GBL1, one first emission control line EML11, and one second emission control line EML21 may each receive the same signals from the two driving circuits 300. However, this is only an example, and one of the two driving circuits 300, illustrated in FIG. 4, may be omitted.

The driving circuits 300 may each include a scan driving circuit and an emission control driving circuit. The scan driving circuit is connected to the initialization scan lines GIL1 to GILn, the write scan lines GWL1 to GWLn, and the black scan lines GBL1 to GBLn, and the emission control driving circuit connected to the first emission control lines EML11 to EML1*n* and the second emission control lines EML21 to EML2*n*. According to an embodiment of the present inventive concept, the scan driving circuit and the emission control driving circuit may be spaced apart from each other with the display region DA disposed therebetween.

The initialization scan lines GIL1 to GILn, the write scan lines GWL1 to GWLn, the black scan lines GBL1 to GBLn, the first emission control lines EML11 to EML1*n*, and the second emission control lines EML21 to EML2*n* may each extend in the second direction DR2, and the initialization scan lines GIL1 to GILn, the write scan lines GWL1 to GWLn, the black scan lines GBL1 to GBLn, the first emission control lines EML11 to EML1*n*, and the second emission control lines EML21 to EML2*n* may be spaced apart from each other in the first direction DR1.

Each of the plurality of pixels PX may be electrically connected to three scan lines, two emission control lines, and one data line. For example, as illustrated in FIG. 4, pixels PX on the first row may be connected to the scan lines GIL1, GWL1, and GBL1, and the first and second emission control lines EML11 and EML21. The first-row pixels may be connected to the data line DL1. In addition, pixels PX on the j-th row may be connected to the scan lines GILj, GWLj, and GBLj and the first and second emission control lines EML1j and EML2j. The voltage generator 400 generates voltages for operation of a display panel DP.

In this embodiment, the voltage generator 400 may generate a first driving voltage ELVDD, a second driving voltage ELVSS, a first initialization voltage Vint, and a second initialization voltage Aint.

Figure 5:
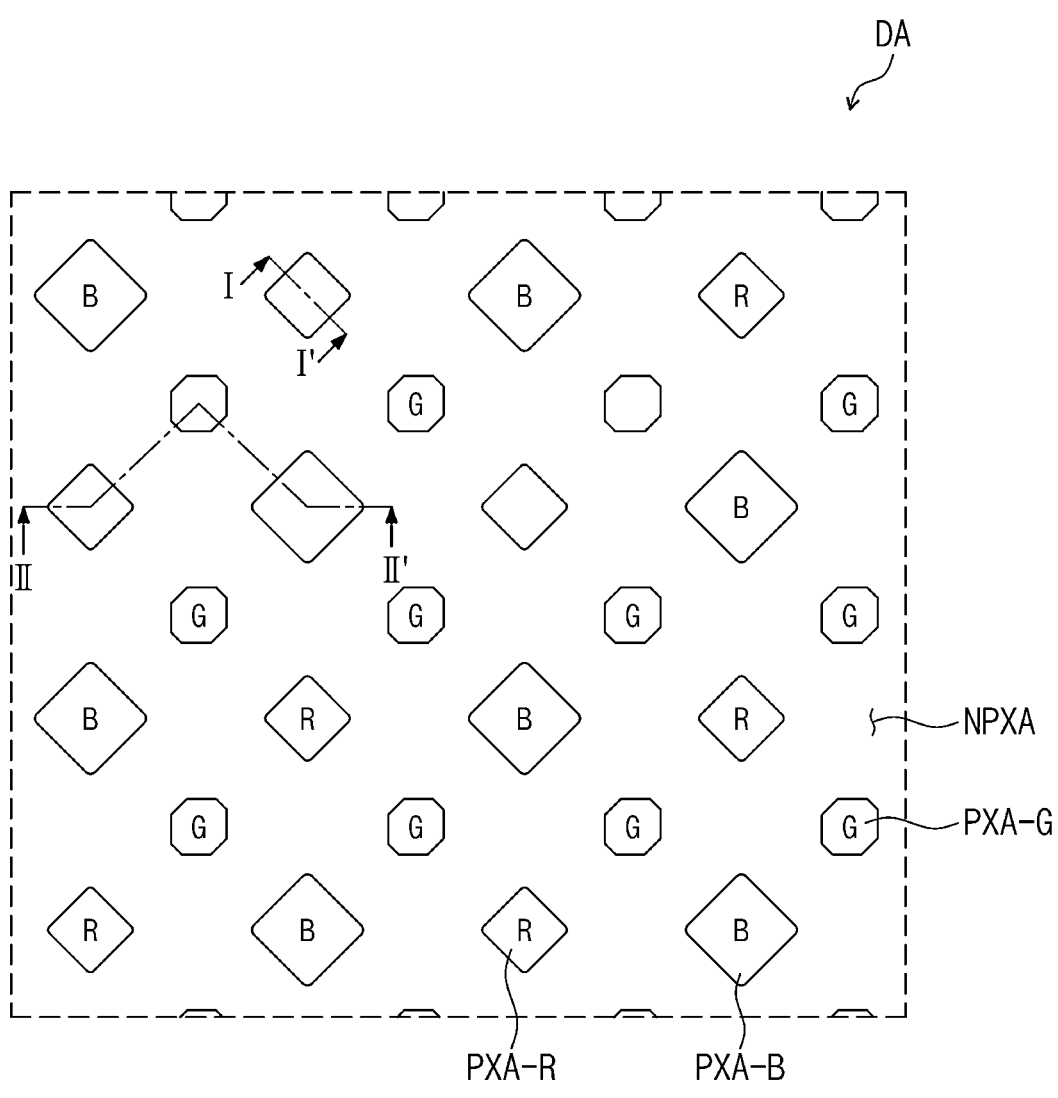
FIG. 5 is an enlarged plan view illustrating a portion of a display device according to an embodiment of the present inventive concept.
Figure 5:
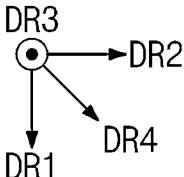

FIG. 5 is an enlarged plan view illustrating a portion of the display device DD (see FIG. 4) according to an embodiment of the present inventive concept. FIG. 5 illustrates a plan view of the display device DD viewed on the display region DA (see FIG. 4) of the display layer DPL (see FIG. 4), and illustrates the arrangement of a plurality of light-emitting regions PXA-R, PXA-G, and PXA-B.

Referring to FIG. 5, the display region DA may include the first to third light-emitting regions PXA-R, PXA-G, and PXA-B, and a non-light-emitting region NPXA at least partially surrounding the first to third light-emitting regions PXA-R, PXA-G, and PXA-B. The first to third light-emitting regions PXA-R, PXA-G, and PXA-B may respectively correspond to regions where light, provided from light-emitting elements ED1, ED2, and ED3, is emitted. The first to third light-emitting regions PXA-R, PXA-G, and PXA-B may be distinguished from one another according to the color of light that is emitted to the outside of the display device DD (see FIG. 4).

The first to third light-emitting regions PXA-R, PXA-G, and PXA-B may respectively provide first to third color light that are different colors from each other. For example, the first color light may be red light. The second color light may be green light, and the third color light may be blue light. However, an example of the first to third color light is not necessarily limited to the above-mentioned example.

The first to third light-emitting regions PXA-R, PXA-G, and PXA-B may each be a region where an upper surface of an anode is exposed by a light-emitting opening, to be described later. The non-light-emitting region NPXA may set boundaries of the first to third light-emitting regions PXA-R, PXA-G, and PXA-B, and prevent color mixing between the first to third light-emitting regions PXA-R, PXA-G, and PXA-B.

The first to third light-emitting regions PXA-R, PXA-G, and PXA-B may each be provided in plurality, and may thus be repeatedly disposed with a predetermined arrangement in the display region DA. For example, the first and third light-emitting regions PXA-R and PXA-B may be alternately arranged along a first direction DR1 to form a 'first group'. The second light-emitting regions PXA-G may be arranged along the first direction DR1 to form a 'second group'. The 'first group' and the 'second group' may each be provided in plurality, and the 'first groups' and the 'second groups' may be alternately arranged along a second direction DR2.

One second light-emitting region PXA-G may be disposed spaced apart from one first light-emitting region PXA-R or one third light-emitting region PXA-B in a fourth direction DR4. The fourth direction DR4 may be a direction between the first direction DR1 and the second direction DR2.

In addition, FIG. 5 illustrates the arrangement of the first to third light-emitting regions PXA-R, PXA-G, and PXA-B, but an embodiment of the present inventive concept is not limited thereto, and the arrangement form may vary. In an embodiment of the present inventive concept, the first to third light-emitting regions PXA-R, PXA-G, and PXA-B may have a PENTILE™ arrangement form as illustrated in FIG. 5. In addition, the first to third light-emitting regions PXA-R, PXA-G, and PXA-B may also have a stripe arrangement form or a Diamond Pixel™ arrangement form.

Each of the first to third light-emitting regions PXA-R, PXA-G, and PXA-B may have various shapes on a plane. For example, each of the first to third light-emitting regions PXA-R, PXA-G, and PXA-B may have a polygonal, circle, oval shape, or the like. FIG. 5 illustrates the first and third light-emitting regions PXA-R and PXA-B having a quadrilateral shape (or a diamond shape) and the second light-emitting region PXA-G having an octagonal shape on a plane.

The first to third light-emitting regions PXA-R, PXA-G, and PXA-B may have the same shape as each other, or at least some of the first to third light-emitting regions PXA-R, PXA-G, and PXA-B may have different shapes from each other on a plane. FIG. 5 illustrates that the first and third light-emitting regions PXA-R and PXA-B have the same shape as each other and the second light-emitting region PXA-G has a different shape from the first and third light-emitting regions PXA-R and PXA-B on a plane.

At least some of the first to third light-emitting regions PXA-R, PXA-G, and PXA-B may have different areas from each other on a plane. In an embodiment of the present inventive concept, the area of the first light-emitting region PXA-R, which emits the red light, may be larger than the area of the second light-emitting region PXA-G, which emits the green light, and smaller than the area of the third light-emitting region PXA-B, which emits the blue light. However, the size relationship between the areas of the first to third light-emitting regions PXA-R, PXA-G, and PXA-B according to the light-emitting color is not limited thereto, and may vary according to the design of the display device DD (see FIG. 4). In addition, an embodiment of the present inventive concept is not limited thereto, and the first to third light-emitting regions PXA-R, PXA-G, and PXA-B may have the same area as each other on a plane.

In addition, the shape, the area, the arrangement, etc. of the first to third light-emitting regions PXA-R, PXA-G, and PXA-B of the display device DD (see FIG. 4), according to an embodiment of the present inventive concept, may be variously designed according to the color of light to be emitted and the size and composition of the display module DM (see FIG. 2), and are not limited to the embodiment illustrated in FIG. 5.

Figure 6A:
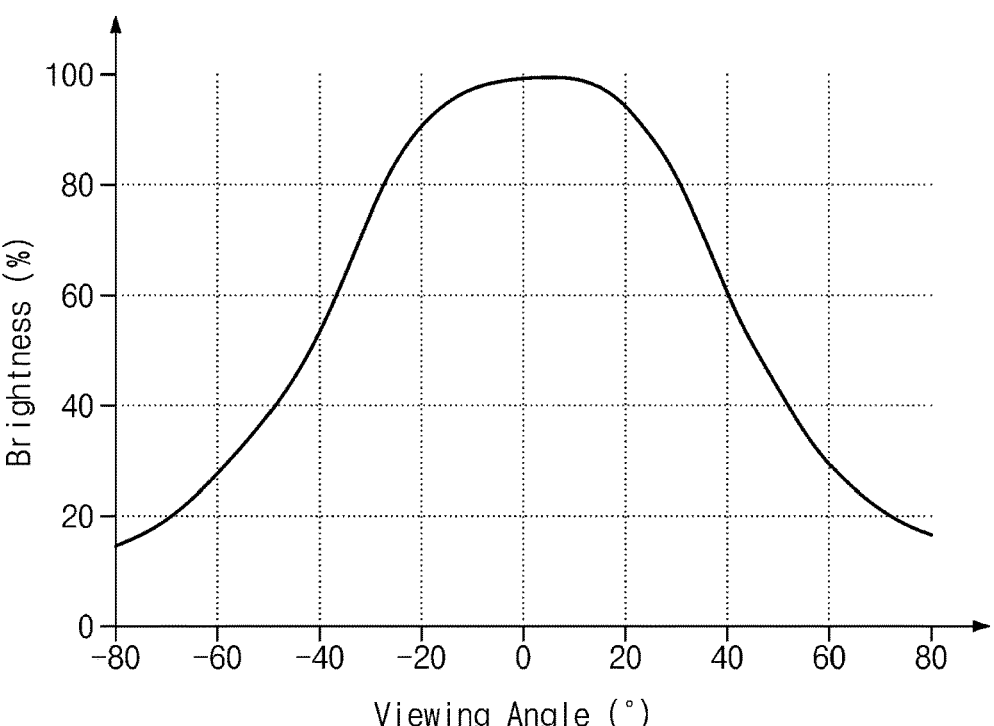
FIG. 6A is a graph showing the brightness according to the viewing angle when a display device, according to an embodiment of the present inventive concept, operates in a first mode.
Figure 6B:
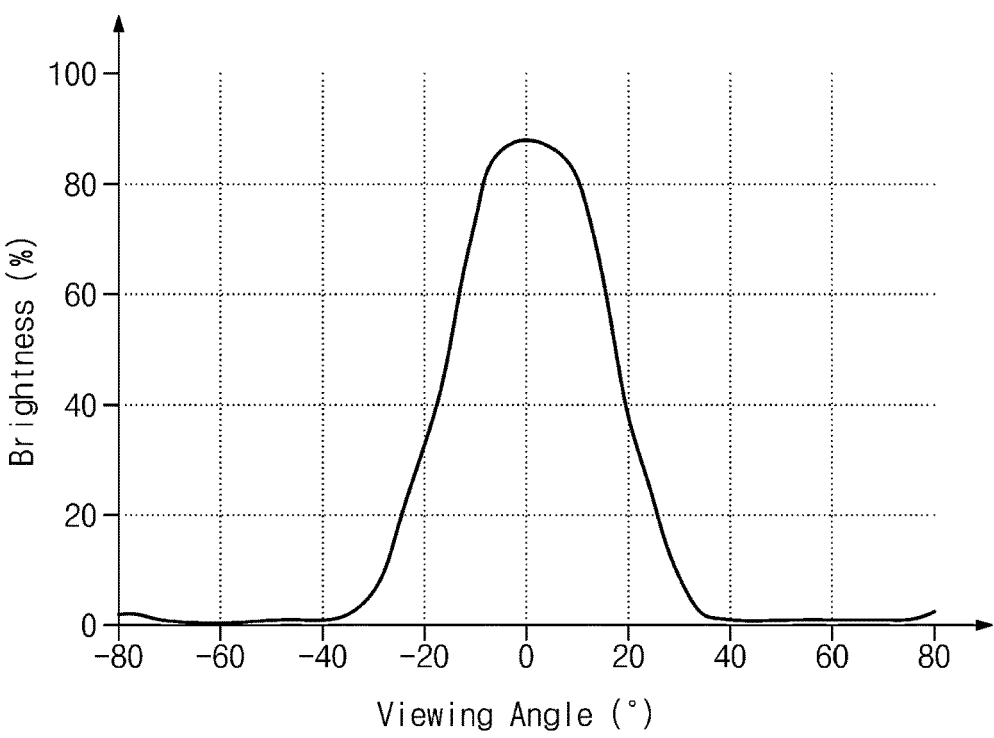
FIG. 6B is a graph showing the brightness according to the viewing angle when a display device, according to an embodiment of the present inventive concept, operates in a second mode.

FIG. 6A is a graph showing the brightness according to the viewing angle when a display device, according to an embodiment of the present inventive concept, operates in a first mode. FIG. 6B is a graph showing the brightness according to the viewing angle when the display device, according to an embodiment of the present inventive concept, operates in a second mode.

Referring to FIGS. 5 and 6A, when the display device operates in the first mode, the brightness at a viewing angle of about 45 degrees may be about 40% of the maximum brightness. Accordingly, an image displayed in the display device DD (see FIG. 1A) may be visible at the viewing angle of about 45 degrees.

Referring to FIGS. 5 and 6B, when the display device operates in the second mode, the brightness at the viewing angle of about 45 degrees may be close to about 0% of the maximum brightness. Accordingly, an image displayed in the display device DD (see FIG. 1A) may be invisible at the viewing angle of about 45 degrees.

According to an embodiment of the present inventive concept, the display device DD (see FIG. 1A) may be switched to the first mode or to the second mode. For example, according to a user's choice or a predetermined regulation, the display device DD (see FIG. 1A) may operate in the second mode where the viewing angle is limited.

Figure 7:
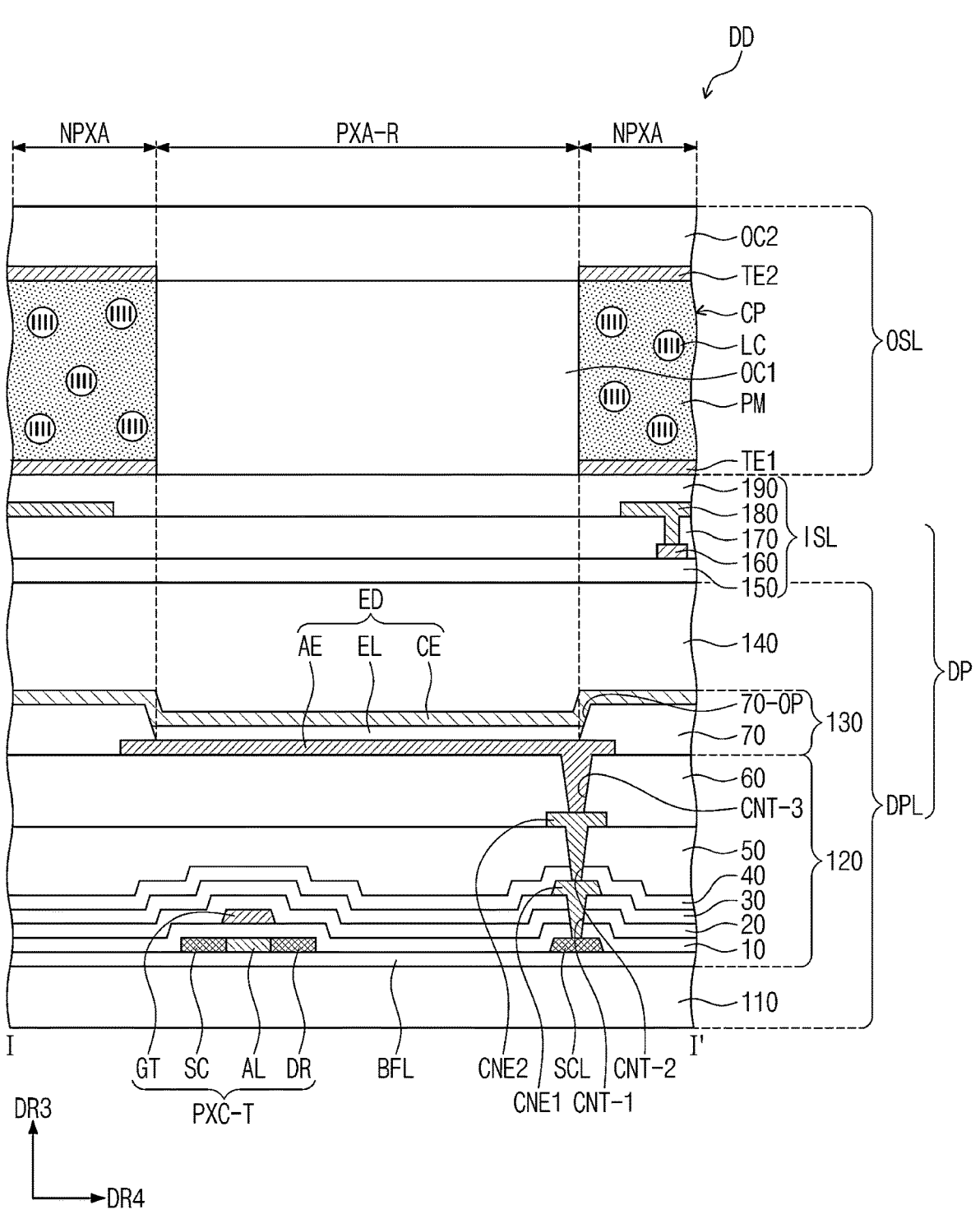
FIG. 7 is a cross-sectional view of a display device according to an embodiment of the present inventive concept.

FIG. 7 is a cross-sectional view of a display device DD according to an embodiment of the present inventive concept. FIG. 7 illustrates a cross section corresponding to line I-I' illustrated in FIG. 5.

Referring to FIG. 7, a display layer DPL may include a base layer 110, a circuit layer 120, a light-emitting element layer 130, and an encapsulation layer 140.

The base layer 110 may be a member that provides a base surface on which the circuit layer 120 is disposed. The base layer 110 may include a synthetic resin layer. The synthetic resin layer may be a polyimide-based resin layer, and the material is not particularly limited thereto. In addition, the base layer 110 may include, for example, a glass substrate, a metal substrate, an organic/inorganic composite material substrate, or the like.

At least one inorganic layer is formed on an upper surface of the base layer 110. For example, the inorganic layer may include at least one of aluminum oxide, titanium oxide, silicon oxide, silicon nitride, silicon oxynitride, zirconium oxide, and/or hafnium oxide. The inorganic layer may be formed in multiple layers. The multi-layer inorganic layers may include a barrier layer and/or buffer layer. In this embodiment, the display layer DPL is illustrated to include the buffer layer BFL.

The buffer layer BFL may increase a bonding force between the base layer 110 and a semiconductor pattern. The buffer layer BFL may include, for example, at least one of silicon oxide, silicon nitride, and/or silicon oxynitride. For example, the buffer layer BFL may include a structure where a silicon oxide layer and a silicon nitride layer are alternately stacked on each other.

The semiconductor pattern may be disposed on the buffer layer BFL. The semiconductor pattern may include polysilicon. However, an embodiment of the present inventive concept is not limited thereto, and the semiconductor pattern may also include amorphous silicon, low temperature polycrystalline silicon, or an oxide semiconductor.

FIG. 7 only illustrates a part of the semiconductor pattern, and the semiconductor pattern may be disposed in other regions. The semiconductor pattern may be arranged in a particular arrangement across pixels. The semiconductor pattern may vary in electrical properties according to whether it is doped or not. The semiconductor pattern may include a first region with high conductivity, and a second region with low conductivity. The first region may be doped with an N-type dopant or a P-type dopant. A P-type transistor may include a region doped with the P-type dopant, and an N-type transistor may include a region doped with the N-type dopant. The second region may be an undoped region or a region doped with concentration that is lower than that of the first region.

The conductivity of the first region may be higher than the conductivity of the second region, and substantially, the first region may serve as an electrode or a signal line. The second region may substantially correspond to an active region (or channel) of a transistor. For example, a portion of the semiconductor pattern may be the active region of the transistor, another portion of the semiconductor pattern may be a source region or a drain region of the transistor, another portion of the semiconductor pattern may be a remainder of the source region and drain region of the transistor, and another portion of the semiconductor pattern may be a connection electrode or a connection signal line.

FIG. 7 illustrates one transistor PXC-T and one light-emitting element ED included in a pixel.

The source region SC, the active region AL (or active, active region), and the drain region DR of the transistor PXC-T may be formed from the semiconductor pattern. The source region SC and the drain region DR may extend from the active region AL in opposite directions from each other on a cross section. For example, the source SC and the drain region DR may be disposed at opposing sides of the active region AL. FIG. 7 illustrates a portion of a connection signal line SCL that is formed from the semiconductor pattern. The connection signal line SCL may be connected to the drain region DR of the transistor PXC-T on a plane.

A first insulation layer 10 may be disposed on the buffer layer BFL. The first insulation layer 10 may overlap a plurality of pixels in common, and may cover the semiconductor pattern. The first insulation layer 10 may be an inorganic layer and/or organic layer, and may have a single-layer or multi-layer structure. The first insulation layer 10 may include, for example, at least one of aluminum oxide, titanium oxide, silicon oxide, silicon nitride, silicon oxynitride, zirconium oxide, and/or hafnium oxide. In this embodiment, the first insulation layer 10 may be a single-layer silicon oxide layer. Not only the first insulation layer 10 but also an insulation layer of the circuit layer 120, to be described later, may be an inorganic layer and/or organic layer, and may have a single-layer or multi-layer structure. The inorganic layer may include at least one of the above-described materials, but an embodiment of the present inventive concept is not limited thereto.

A gate electrode GT of the transistor PXC-T is disposed on the first insulation layer 10. The gate electrode GT may be one portion of a metal pattern. The gate electrode GT overlaps the active region AL. The gate electrode GT may function as a mask in a process of doping the semiconductor pattern.

A second insulation layer 20 may be disposed on the first insulation layer 10 and cover the gate electrode GT. The second insulation layer 20 may overlap the pixels in common. The second insulation layer 20 may be an inorganic layer and/or organic layer, and may have a single-layer or multi-layer structure. The second insulation layer 20 may include, for example, at least one of silicon oxide, silicon nitride, and/or silicon oxynitride. In this embodiment, the second insulation layer 20 may have the multi-layer structure including a silicon oxide layer and a silicon nitride layer.

A third insulation layer 30 may be disposed on the second insulation layer 20. The third insulation layer 30 may have a single-layer or multi-layer structure. For example, the third insulation layer 30 may have the multi-layer structure including a silicon oxide layer and a silicon nitride layer.

A first connection electrode CNE1 may be disposed on the third insulation layer 30. The first connection electrode CNE1 may be connected to the connection signal line SCL through a contact hole CNT-1 that passes through the first, second, and third insulation layers 10, 20, and 30.

A fourth insulation layer 40 may be disposed on the third insulation layer 30. The fourth insulation layer 40 may be a single-layer silicon oxide layer. A fifth insulation layer 50 may be disposed on the fourth insulation layer 40. The fifth insulation layer 50 may be an organic layer.

A second connection electrode CNE2 may be disposed on the fifth insulation layer 50. The second connection electrode CNE2 may be connected to the first connection electrode CNE1 through a contact hole CNT-2 that passes through the fourth insulation layer 40 and the fifth insulation layer 50.

A sixth insulation layer 60 may be disposed on the fifth insulation layer 50 and cover the second connection electrode CNE2. The sixth insulation layer 60 may be an organic layer.

The stacked relationship of the circuit layer 120 illustrated in FIG. 7 is only an example, and an embodiment of the present inventive concept is not limited particularly thereto. For example, at least any one among the first to sixth insulation layers 10, 20, 30, 40, 50, and 60 may be omitted, and other insulation layers may be added.

The light-emitting element layer 130 may be disposed on the circuit layer 120. The light-emitting element layer 130 may include a light-emitting element ED. For example, the light-emitting element layer 130 may include an organic light-emitting material, an inorganic light-emitting material, an organic-inorganic light-emitting material, quantum dots, quantum rods, a micro-LED, or nano-LED. Hereinafter, the light-emitting element ED is described as the organic light-emitting element as an example, but an embodiment of the present inventive concept is not particularly limited thereto.

The light-emitting element ED may include a first electrode AE, a light-emitting layer EL, and a second electrode CE.

The first electrode AE may be disposed on the sixth insulation layer 60. The first electrode AE may be connected to the second connection electrode CNE2 through a contact hole CNT-3 that passes through the sixth insulation layer 60.

A pixel-defining layer 70 may be disposed on the sixth insulation layer 60, and may cover a portion of the first electrode AE. An opening 70-OP is provided in the pixel-defining layer 70. The opening 70-OP of the pixel-defining layer 70 may expose at least a portion of the first electrode AE.

The display region DA (see FIG. 4) may include a light-emitting region PXA-R and a non-light-emitting region NPXA that is adjacent to the light-emitting region PXA-R. The non-light-emitting region NPXA may surround the light-emitting region PXA-R. In this embodiment, the light-emitting region PXA-R may correspond to a partial region of the first electrode AE that is exposed by the opening 70-OP. In addition, FIG. 7 illustrates each of the components of the display device DD on a cross section corresponding to the first light-emitting region PXA-R, and a similar description may be applied to cross sections corresponding to a second light-emitting region PXA-G and a third light-emitting region PXA-B.

The light-emitting layer EL may be disposed on the first electrode AE. The light-emitting layer EL may be disposed in a region corresponding to the opening 70-OP. For example, the light-emitting layer EL may be formed separately for each pixel. When the light-emitting layer EL is formed separately for each pixel, the light-emitting layers EL may each emit light of at least one color of blue color, red color, or green color. However, an embodiment of the present inventive concept is not limited thereto, and the light-emitting layer EL may also be connected to the pixels to be provided in common. In this case, the light-emitting layer EL may provide blue light, or may also provide white light.

The second electrode CE may be disposed on the light-emitting layer EL. The second electrode CE may have an integrated shape and may be disposed on a plurality of pixels in common.

A hole control layer may be disposed between the first electrode AE and the light-emitting layer EL. The hole control layer may be disposed in the light-emitting region PXA and the non-light-emitting region NPXA in common. The hole control layer may include a hole transport layer, and may further include a hole injection layer. An electron control layer may be disposed between the light-emitting layer EL and the second electrode CE. The electron control layer may include an electron transport layer, and may further include an electron injection layer. The hole control layer and the electron control layer may be formed on the plurality of pixels in common by using an open mask.

The encapsulation layer 140 may be disposed on the light-emitting element layer 130. The encapsulation layer 140 may include an inorganic layer, an organic layer, and an inorganic layer that are stacked on each other in sequence, but the layers constituting the encapsulation layer 140 are not limited thereto.

The inorganic layers may protect the light-emitting element layer 130 from moisture and oxygen, and the organic layer may protect the light-emitting element layer 130 from foreign substances such as dust particles. The inorganic layers may include, for example, a silicon nitride layer, a silicon oxynitride layer, a silicon oxide layer, a titanium oxide layer, an aluminum oxide layer, or the like. The organic layer may include an acrylate-based organic layer, and an embodiment of the present inventive concept is not limited thereto.

An input sensor ISL may include a base layer 150, a first conductive layer 160, a sensing insulation layer 170, a second conductive layer 180, and a cover insulation layer 190.

The base layer 150 may be an inorganic layer including, for example, at least one of silicon nitride, silicon oxynitride, or silicon oxide. In addition, the base layer 150 may also be an organic layer including an epoxy resin, an acrylate resin, or an imide-based resin. The base layer 150 may have a single-layer structure, or may have a structure of multiple layers stacked along a third direction DR3. According to an embodiment of the present inventive concept, the base layer 150 may be omitted.

The first conductive layer 160 and the second conductive layer 180 may each have a single-layer structure, or may have a structure of multiple layers stacked along the third direction DR3.

The single-layer conductive layer may include a metal layer or a transparent conductive layer. The metal layer may include, for example, molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium zinc tin oxide (IZTO), or the like. In addition, the transparent conductive layer may include a conductive polymer such as PEDOT, metal nanowire, graphene, etc.

The multi-layer conductive layer may include metal layers. The metal layers may include a three-layer structure of, for example, titanium/aluminum/titanium. The multi-layer conductive layer may include at least one metal layer and at least one transparent conductive layer.

At least any one of the sensing insulation layer 170 or the cover insulation layer 190 may include an inorganic film. The inorganic film may include, for example, at least one of aluminum oxide, titanium oxide, silicon oxide, silicon nitride, silicon oxynitride, zirconium oxide, and/or hafnium oxide.

At least any one of the sensing insulation layer 170 or the cover insulation layer 190 may include an organic film. The organic film may include, for example, at least one of an acrylate-based resin, a methacrylate-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

A light-path control layer OSL may be disposed on the input sensor ISL. The light-path control layer OSL may be disposed on the cover insulation layer 190 of the input sensor ISL. For example, the light-path control layer OSL may be directly disposed on the cover insulation layer 190 of the input sensor ISL.

The light-path control layer OSL includes a control pattern CP. The control pattern CP may be disposed on the input sensor ISL.

The control pattern CP includes a polymer that is dispersed liquid crystal. The control pattern CP includes a plurality of liquid crystal molecules LC and a polymer PM in which the plurality of liquid crystal molecules LC are dispersed.

The polymer PM may be a dispersion medium which disperses the liquid crystal molecules LC, and may be a curable polymer that hardens by heat or light. The curable polymer may be any one of amorphous, semicrystalline monomers and/or oligomers. The polymer PM may be, for example, an ultraviolet curable polymer.

For example, the polymer PM may include at least any one of a urethane acrylate oligomer, 2(2-ethoxyethoxy) ethyl acrylate (EOEOEA), isobornyl acrylate (IOBA), trimethylolpropane triacrylate (TMPTA), tri(propylene glycol) diacrylate (TPGDA), pentaerythritol triacrylate (PETA), hydroxyethyl acrylate (HEA), trimethylolpropane ethoxylate triacrylate (TMPEOTA), 2-phenoxyethyl acrylate (2-PEA), methyl methacrylate (MMA), methacrylate (MA), tetrahydrofurfuryl acrylate, tri(propylene glycol) glycerolate diacrylate (TPGDA), vinyl acrylate (VA), ethylene glycol dimethacrylate (EGDA), epoxy acrylate monomer or oligomer, 1,6-hexandiol diacrylate (HAD), 2-hydroxyethyl methacrylate (2-HEMA), 2-ethylheyxylacrylate, ethylene glycol diacrylate, trimethylolpropane diallyl ether, urethane diacrylate, or 2-phenoxyethyl acrylate, an/or tetrahydrofurfuryl acrylate.

The plurality of liquid crystal molecules LC may be dispersed in the polymer PM, and each of the plurality of liquid crystal molecules LC may have a spherical shape. In the control pattern CP, the ratio of a weight of the plurality of liquid crystal molecules LC to a weight of the polymer PM may be about 80 to about 120 weight of the weight of the plurality of liquid crystal molecules LC to about 100 weight of the polymer PM. In addition, FIG. 7 illustrates that the plurality of liquid crystal molecules LC are aligned to have a certain direction, but according to the operation of the display device DD either in a first mode or in a second mode, it may be determined whether the liquid crystal molecules LC have an orientation or not. This will be described in more detail later in descriptions with reference to FIGS. 9A and 9B.

The plurality of liquid crystal molecules LC may each include a plurality of liquid crystals. The plurality of liquid crystals may each have a shape of an elongated stick, rod, or cylinder. The liquid crystals may have a flow viscosity ($mm^2$/s) of about 20 to about 100, a refractive index anisotropy of about 0.15 to about 0.30, and a dielectric anisotropy (1.0 kHz) of about +2.0 to about +40.0.

The light-path control layer OSL may further include a first transparent electrode TE1 and a second transparent electrode TE2. The first transparent electrode TE1 may be disposed under the control pattern CP. The second transparent electrode TE2 may be disposed above the control pattern CP, and may thus be spaced apart from the first transparent electrode TE1 with the control pattern CP disposed therebetween. For example, the control pattern CP may be in contact with each of the first transparent electrode TE1 and the second transparent electrode TE2.

The first transparent electrode TE1 and the second transparent electrode TE2 may each include an optically transparent conductive material. The first transparent electrode TE1 and the second transparent electrode TE2 may each include a transparent conductive oxide (TCO). For example, the first transparent electrode TE1 and the second transparent electrode TE2 may each include indium tin oxide (ITO).

A power V1 (see FIG. 9A), capable of applying a driving voltage, may be provided to the first transparent electrode TE1 and the second transparent electrode TE2. When the driving voltage is applied to the first transparent electrode TE1 and the second transparent electrode TE2, the plurality of liquid crystal molecules LC included in the control pattern CP may be disposed to have a certain direction. When the driving voltage is not applied to the first transparent electrode TE1 and the second transparent electrode TE2, the plurality of liquid crystal molecules LC may be randomly disposed without a certain direction. This will be described in more detail later in the descriptions with reference to FIGS. 9A and 9B.

The light-path control layer OSL may further include a filling pattern OC1 and an overcoat layer OC2.

The filling pattern OC1 may be disposed on the input sensor ISL. The filling pattern OC1 may be disposed on the cover insulation layer 190. For example, the filling pattern OC1 may be directly disposed on the cover insulation layer 190.

The filling pattern OC1 may be disposed between adjacent two control patterns CP. The filling pattern OC1 may charge a space that is between the two control patterns CP that are spaced apart from each other along one direction (for example, a fourth direction DR4). For example, the filling pattern OC1 may be in contact with a side surface of each of the two control patterns CP that are spaced apart from each other.

The filling pattern OC1 may include an optically transparent organic material. At least a portion of the filling pattern OC1 may overlap the light-emitting region PXA-R. The filling pattern OC1 may include a transparent organic material, and thus, light provided from the light-emitting element ED may pass through the filling pattern OC1.

The overcoat layer OC2 may be disposed on the filling pattern OC1 and the control patterns CP. The overcoat layer OC2 may be disposed on the second transparent electrode TE2. The overcoat layer OC2 may cover an upper part of the filling pattern OC1 and an upper part of the second transparent electrode TE2. The overcoat layer OC2 may be disposed on the filling pattern OC1 and the second transparent electrode TE2. For example, the overcoat layer OC2 may be directly disposed on the filling pattern OC1 and the second transparent electrode TE2.

The overcoat layer OC2 may be disposed on the filling pattern OC1, the control pattern CP, and the second transparent electrode TE2, and may protect the components disposed thereunder and remove a step difference to provide a flat upper surface.

The overcoat layer OC2 may include an optically transparent organic material. The overcoat layer OC2 may include a transparent organic material, and thus, light provided from the light-emitting element ED may pass through the overcoat layer OC2. The overcoat layer OC2 may include the same material as that of the filling pattern OC1. In addition, the filling pattern OC1 and the overcoat layer OC2 may be formed through separate processes, and thus, a visible boundary surface may be formed between the filling pattern OC1 and the overcoat layer OC2.

Figure 8:
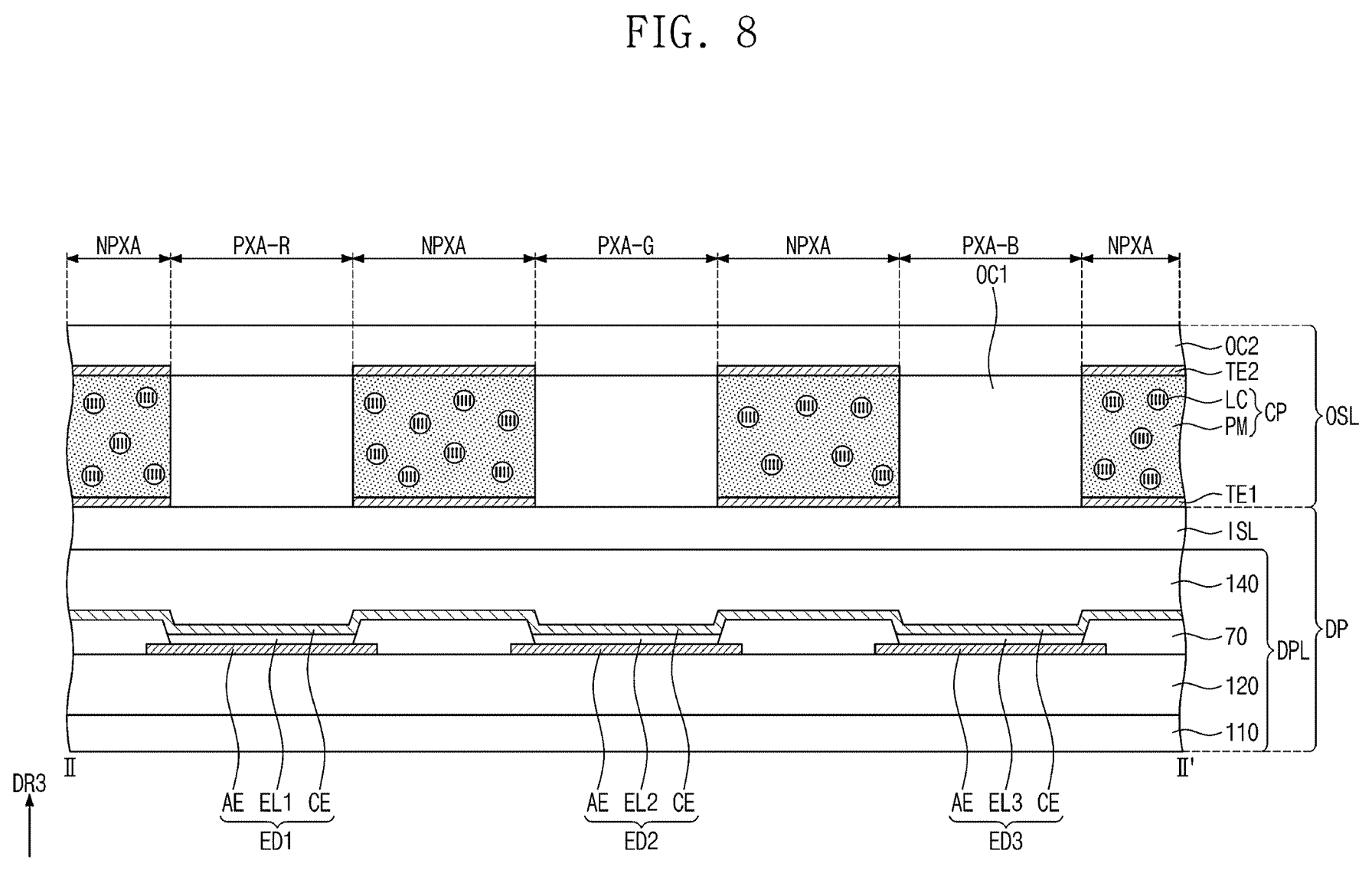

FIG. 8 is a cross-sectional view of a display device DD according to an embodiment of the present inventive concept. FIG. 8 illustrates a cross section corresponding to line II-II' illustrated in FIG. 5. FIG. 8 illustrates the cross section corresponding to adjacent light-emitting regions PXA-R, PXA-G, and PXA-B, which are different from each other, and a non-light-emitting region NPXA thereard.

Referring to FIG. 8, a base layer 110 may include a single-layer or multi-layer structure. For example, the base layer 110 may include a first synthetic resin layer, a multi-layer or single-layer intermediate layer, and a second synthetic resin layer that are stacked in sequence. The intermediate layer may be referred to as a base barrier layer. The intermediate layer may include, for example, a silicon oxide (SiOx) layer and an amorphous silicon (a-Si) layer disposed on the silicon oxide layer, but an embodiment of the present inventive concept is not particularly limited thereto. For example, the intermediate layer may include at least one of a silicon oxide layer, a silicon nitride layer, a silicon oxynitride layer, and/or an amorphous silicon layer.

The first and second synthetic resin layers may each include a polyimide-based resin. In addition, the first and second synthetic resin layers may each include, for example, at least one of an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and/or a perylene-based resin. In this specification, "a"-based resin means including the functional group of "a".

A circuit layer 120 may be disposed on the base layer 110, and the circuit layer 120 may include a plurality of transistors. The transistors may each include a control electrode, an input electrode, and an output electrode. The circuit layer 120 may include the plurality of transistors to drive light-emitting elements ED1, ED2, and ED3 of a light-emitting element layer 130.

The light-emitting element layer 130 may include a pixel-defining layer 70 and first to third light-emitting elements ED1, ED2, and ED3. A plurality of pixel openings, in which at least portions of the first to third light-emitting elements ED1, ED2, and ED3 are respectively disposed, may be defined in the pixel-defining layer 70. The pixel-defining layer 70 may include an organic light-blocking material or an inorganic light-blocking material including a black pigment or black dye.

A display panel DP may be divided into the non-light-emitting region NPXA and the light-emitting regions PXA-R, PXA-G, and PXA-B. The light-emitting regions PXA-R, PXA-G, and PXA-B may be regions where light that is generated from the first to third light-emitting elements ED1, ED2, and ED3 are emitted, respectively. The light-emitting regions PXA-R, PXA-G, and PXA-B may be spaced apart from each other on a plane.

The light-emitting regions PXA-R, PXA-G, and PXA-B may be regions that are separated by the pixel-defining layer 70. The non-light-emitting regions NPXA may be regions between the adjacent light-emitting regions PXA-R, PXA-G, and PXA-B, and corresponding to the pixel-defining layer 70. In addition, in this specification, the light-emitting regions PXA-R, PXA-G, and PXA-B may each correspond to a pixel. The pixel-defining layer 70 may separate the first to third light-emitting elements ED1, ED2, and ED3 from each other. Light-emitting layers EL1, EL2, and EL3 of the first to third light-emitting elements ED1, ED2, and ED3 may be separated from each other by being disposed in pixel openings that are provided in the pixel-defining layer 70. For example, the light emitting layers EL1, EL2, and EL3 are separated from each other by the pixel-defining layer 70.

The light-emitting regions PXA-R, PXA-G, and PXA-B may be divided into a plurality of groups according to the color of light that is generated from the first to third light-emitting elements ED1, ED2, and ED3. FIG. 8 illustrates that the display panel DP according to an embodiment of the present inventive concept includes three light-emitting regions PXA-R, PXA-G, and PXA-B that respectively emit red light, green light, and blue light. For example, the display device DD according to an embodiment of the present inventive concept may include a red light-emitting region PXA-R, a green light-emitting region PXA-G, and a blue light-emitting region PXA-B that are separated from each other.

The first to third light-emitting elements ED1, ED2, and ED3 may be spaced apart from each other in one direction (for example, a second direction DR2 or fourth direction DR4) that is perpendicular to a thickness direction DR3. The first to third light-emitting elements ED1, ED2, and ED3 may emit light in different wavelength regions. For example, the first light-emitting element ED1 may emit the red light. Further, the second light-emitting element ED2 may emit the green light, and the third light-emitting element ED3 may emit the blue light. The red light-emitting region PXA-R, the green light-emitting region PXA-G, and the blue light-emitting region PXA-B may respectively correspond to the first light-emitting element ED1, the second light-emitting element ED2, and the third light-emitting element ED3. However, an embodiment of the present inventive concept is not limited thereto, and the first to third light-emitting elements ED1, ED2, and ED3 may emit light in the same wavelength region, or at least one may emit light in a different wavelength region. For example, all of the first to third light-emitting elements ED1, ED2, and ED3 may emit the blue light.

The light-emitting elements ED1, ED2, and ED3 may each include a first electrode AE, a second electrode CE disposed on the first electrode AE, and the light-emitting layer EL1, EL2, or EL3 disposed between the first electrode AE and the second electrode CE. The first electrode AE may be exposed by the pixel opening of the pixel-defining layer 70.

In addition, each of the light-emitting elements ED1, ED2, and ED3 may further include a hole control layer and an electron control layer. The hole control layer may be disposed between the first electrode AE and the light-emitting layer EL1, EL2, or EL3. The electron control layer may be disposed between the light-emitting layer EL1, EL2, or EL3 and the second electrode CE. In addition, the hole control layer and the electron control layer may be formed as common layers to overlap each of the red light-emitting region PXA-R, the green light-emitting region PXA-G, and the blue light-emitting region PXA-B by using an opening mask.

The first electrode AE may be an anode. However, an embodiment of the present inventive concept is not limited thereto. In addition, the first electrode AE may be a pixel electrode. The first electrode AE may be a transmissive electrode, a transflective electrode, or a reflective electrode. The first electrode AE may include, for example, at least one of Ag, Mg, Cu, Al, Pt, Pd, Au, Ni, Nd, Ir, Cr, Li, Ca, LiF, Mo, Ti, W, In, Sn, and/or Zn, a compound of at least two selected therefrom, a mixture of at least two selected therefrom, and/or an oxide thereof.

In case that the first electrode AE is the transmissive electrode, the first electrode AE may include a transparent metal oxide, for example, indium tin oxide (ITO), indium zinc oxide (IZO), zinc oxide (ZnO), indium tin zinc oxide (ITZO), etc. In case that the first electrode AE is the transflective electrode or reflective electrode, the first electrode AE may include Ag, Mg, Cu, Al, Pt, Pd, Au, Ni, Nd, Ir, Cr, Li, Ca, LiF/Ca (a stacked structure of LiF and Ca), LiF/Al (a stacked structure of LiF and Al), Mo, Ti, W, or a compound thereof or mixture thereof (for example, a mixture of Ag and Mg). For example, the first electrode AE may have a multi-layer structure including a reflective film or transflective film formed of the above-mentioned materials, and a transparent conductive film formed of indium tin oxide (ITO), indium zinc oxide (IZO), zinc oxide (ZnO), indium tin zinc oxide (ITZO), etc. For example, the first electrode AE may have a three-layer structure of ITO/Ag/ITO, but an embodiment of the present inventive concept is not limited thereto. In addition, the first electrode AE may include the above-described metal materials, a combination of at least two metal materials selected from the above-described metal materials, an oxide of the above-described metal materials, or the like, and an embodiment of the present inventive concept is not limited thereto.

The light-emitting layers EL1, EL2, and EL3 may each have a single layer made of a single material, a single layer made of a plurality of different materials, or a multi-layer structure including a plurality of layers made of a plurality of different materials. For example, the light-emitting layers EL1, EL2, and EL3 may include anthracene derivatives, pyrene derivatives, fluoranthene derivatives, chrysene derivatives, dihydrobenzanthracene derivatives, or triphenylene derivatives.

For example, the light-emitting layers EL1, EL2, and EL3 may each include one host and one dopant. In addition, the light-emitting layers EL1, EL2, and EL3 may each include at least two hosts and two dopants.

The light-emitting layer EL3 of the third light-emitting element ED3 that emits the blue light may emit thermally activated delayed fluorescence (TADF) or phosphorescence. The light-emitting layer EL3 of the third light-emitting element ED3 may include a material of the thermally activated delayed fluorescence and/or a material of the phosphorescence. The third light-emitting element ED3, including the material of the thermally activated delayed fluorescence and/or the material of the phosphorescence, may exhibit excellent luminous efficiency.

For example, the light-emitting layers EL1, EL2, and EL3 may include, as a known dopant material, a styryl derivative (for example, 1,4-bis [2-(3-N-ethylcarbazolyl)vinyl]benzene(BCzVB), 4-(di-p-tolylamino)-4'-[(di-p-tolylamino) styryl]stilbene(DPAVB), N-(4-((E)-2-(6-((E)-4-(diphenylamino)styryl)naphthalen-2-yl)vinyl)phenyl)-N-phenylbenzenamine(N-BDAVBi)), 4,4'-bis [2-(4-(N,N-diphenylamino)phenyl)vinyl]biphenyl(DPAVBi)), perylene and a derivative thereof (for example, 2, 5, 8, 11-tetra-t-butylperylene(TBP)), pyrene and a derivative thereof (for example, 1, 1-dipyrene, 1, 4-dipyrenylbenzene, 1, 4-bis(N, N-diphenylamino)pyrene), etc.

For example, the light-emitting layers EL1, EL2, and EL3 may include a known phosphorescence dopant material. For example, for the phosphorescence dopant, a metal complex including iridium (Ir), platinum (Pt), osmium (Os), gold (Au), titanium (Ti), zirconium (Zr), hafnium (Hf), europium (Eu), terbium (Tb), or thulium (Tm) may be used. In particular, iridium(III) bis(4,6-difluorophenylpyridinato-N, C2')picolinate (FIrpic), bis(2,4-difluorophenylpyridinato)-tetrakis(1-pyrazolyl)borate iridium(III) (Flr6), or platinum octaethyl porphyrin (PtOEP) may be used for the phosphorescence dopant. However, an embodiment of the present inventive concept is not limited thereto.

The second electrode CE may be a common electrode. The second electrode CE may be a cathode, but an embodiment of the present inventive concept is not limited thereto. For example, the second electrode CE may include at least one of Ag, Mg, Cu, Al, Pt, Pd, Au, Ni, Nd, Ir, Cr, Li, Ca, LiF, Mo, Ti, W, In, Sn, and Zn, a compound of at least two selected therefrom, a mixture of at least two selected therefrom, and/or an oxide thereof.

The light-emitting elements ED1, ED2, and ED3 may further include a capping layer disposed on the second electrode CE. The capping layer may be an organic layer or an inorganic layer. For example, when the capping layer includes an inorganic material, the inorganic material may include an alkali metal compound such as LiF, an alkali earth metal compound such as $MgF_2$, SiON, SiNx, SiOy, etc. For example, when the capping layer includes an organic material, the organic material may include α-NPD, NPB, TPD, m-MTDATA, $Alq_3$, CuPc, N4,N4,N4',N4'-tetra (biphenyl-4-yl) biphenyl-4,4'-diamine (TPD15), 4,4',4''-tris (carbazol-9-yl)triphenylamine (TCTA), etc., or may include an epoxy resin, or acrylate such as methacrylate.

An encapsulation layer 140 may be disposed on the light-emitting element layer 130. The encapsulation layer 140 may include an inorganic layer, an organic layer, and an inorganic layer stacked on each other in sequence.

An input sensor ISL may be disposed on the encapsulation layer 140. The input sensor ISL may be disposed on the encapsulation layer 140. For example, the input sensor ISL may be directly disposed on the encapsulation layer 140.

A light-path control layer OSL may be disposed on the input sensor ISL. The light-path control layer OSL includes a control pattern CP. The control pattern CP is disposed on the input sensor ISL and includes a polymer that disperses liquid crystal. The control pattern CP includes a plurality of liquid crystal molecules LC and a polymer PM in which the plurality of liquid crystal molecules LC are dispersed.

The control pattern CP may be disposed in correspondence to the non-light-emitting region NPXA. The control pattern CP may be disposed to overlap the pixel-defining layer 70 on a plane. As illustrated in FIG. 8, the control pattern CP may overlap the non-light-emitting region NPXA, and might not overlap the light-emitting regions PXA-R, PXA-G, and PXA-B. For example, the control pattern CP may entirely overlap the non-light-emitting region NPXA. For example, the control pattern CP might not overlap each of the light-emitting elements ED1, ED2, and ED3 on a plane. In addition, the control pattern CP might not also overlap a portion of the non-light-emitting region NPXA. In addition, the control pattern CP may also overlap a portion of the light-emitting regions PXA-R, PXA-G, and PXA-B.

The light-path control layer OSL may further include a first transparent electrode TE1 and a second transparent electrode TE2. The first transparent electrode TE1 may be disposed under the control pattern CP. The second transparent electrode TE2 may be disposed above the control pattern CP. For example, the control pattern CP may be in contact with each of the first transparent electrode TE1 and the second transparent electrode TE2.

The light-path control layer OSL may further include a filling pattern OC1 and an overcoat layer OC2. The filling pattern OC1 may be disposed between the adjacent control patterns CP, and may thus charge a space that is disposed between the control patterns CP that are spaced apart from each other. The overcoat layer OC2 may be disposed on the filling pattern OC1 and the control pattern CP, and may thus cover an upper part of the filling pattern OC1 and an upper part of the second transparent electrode TE2.

Figure 9A:
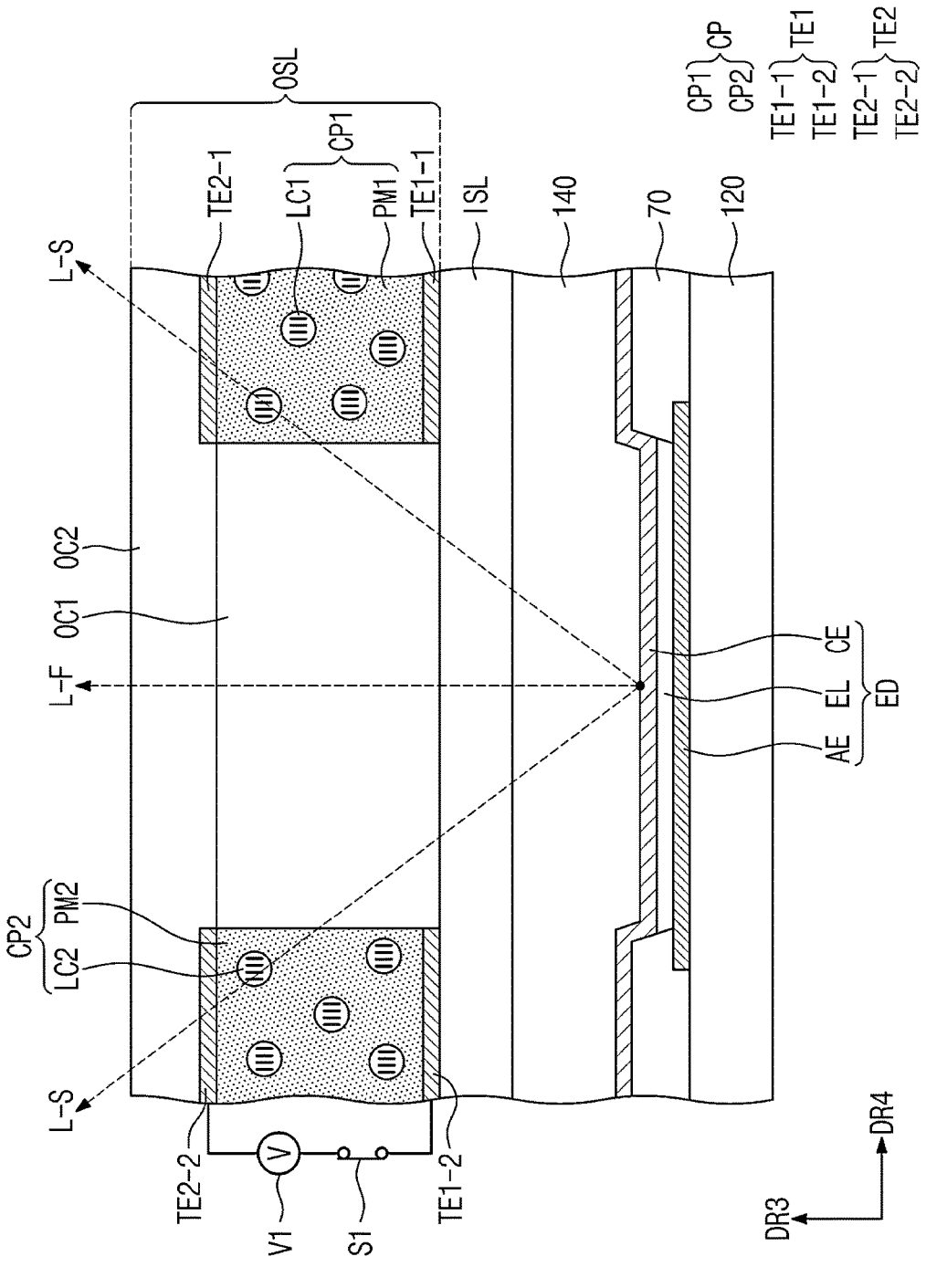
FIG. 9A is a cross-sectional view of a display device, according to an embodiment of the present inventive concept, which operates in a first mode.
Figure 9B:
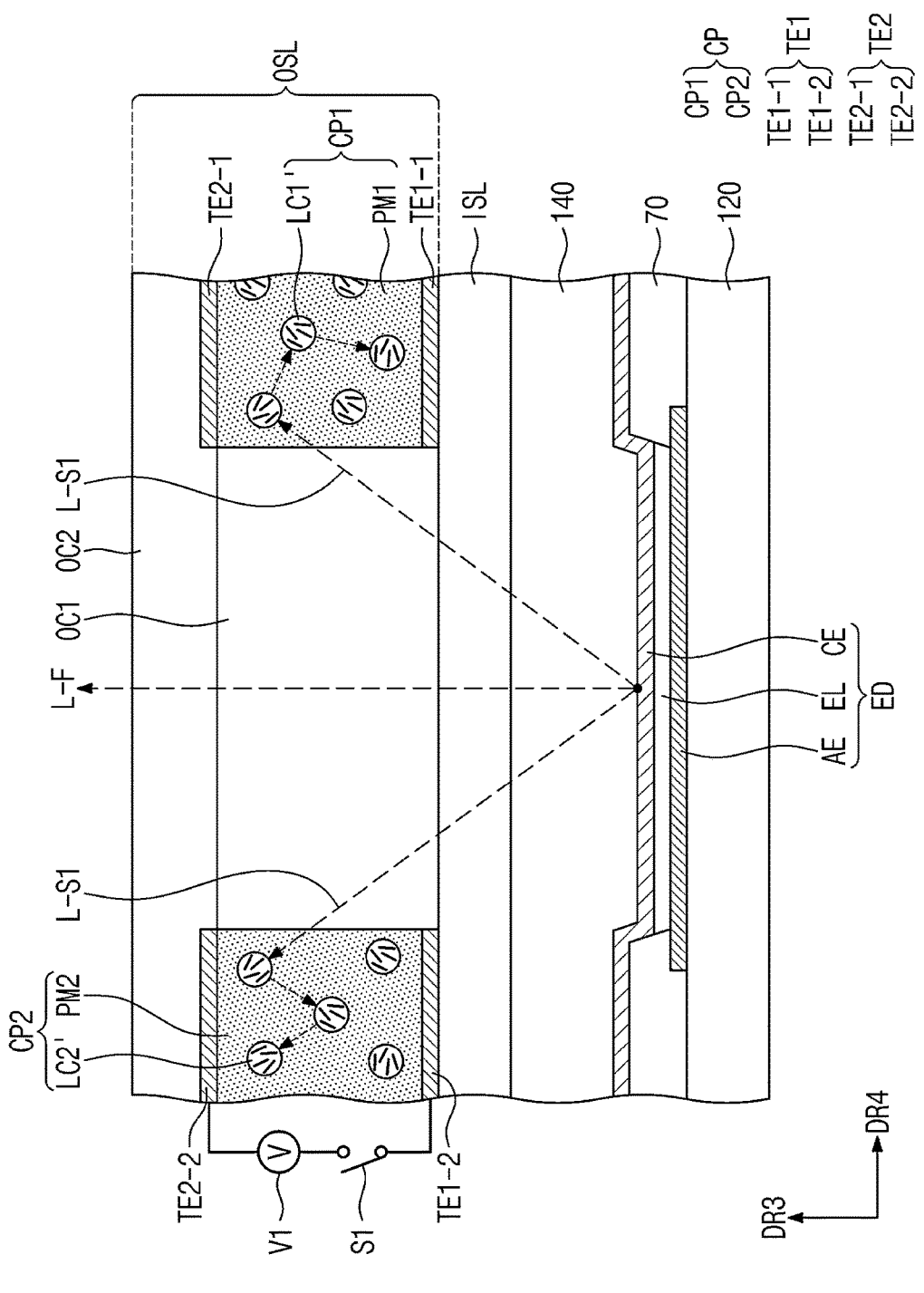
FIG. 9B is a cross-sectional view of a display device, according to an embodiment of the present inventive concept, which operates in a second mode.

FIG. 9A is a cross-sectional view of a display device, according to an embodiment of the present inventive concept, which operates in a first mode. FIG. 9B is a cross-sectional view of a display device, according to an embodiment of the present inventive concept, which operates in a second mode. FIGS. 9A and 9B illustrate heading directions of front-surface light and side-surface light in the first mode and the second mode, respectively, on a cross section corresponding to one light-emitting region and a non-light-emitting region adjacent thereto.

Referring to FIGS. 7 and 9A, the control pattern CP may include a first control pattern CP1 and a second control pattern CP2 that are spaced apart from each other along one direction (for example, a fourth direction DR4). The filling pattern OC1 may be disposed between the first control pattern CP1 and the second control pattern CP2. The overcoat layer OC2 may be disposed on the first control pattern CP1, the second control pattern CP2, and the filling pattern OC1.

The first transparent electrode TE1 may include a (1-1)-th transparent electrode TE1-1, which is disposed under the first control pattern CP1, and a (1-2)-th transparent electrode TE1-2, which is disposed under the second control pattern CP2. The second transparent electrode TE2 may include a (2-1)-th transparent electrode TE2-1, which is disposed above the first control pattern CP1, and a (2-2)-th transparent electrode TE2-2, which is disposed above the second control pattern CP2.

The first control pattern CP1 and the second control pattern CP2 may each include a polymer that disperses liquid crystal. The first control pattern CP1 and the second control pattern CP2 may each include a plurality of liquid crystal molecules LC1 or LC2 and a polymer PM1 or PM2 in which the plurality of liquid crystal molecules LC1 or LC2 are dispersed.

A first power V1 may be provided to the first transparent electrode TE1 and the second transparent electrode TE2. FIG. 9A illustrates only the first power V1 connected to the (1-2)-th transparent electrode TE1-2 and the (2-2)-th transparent electrode TE2-2, but the first power V1 may also be provided to the (1-1)-th transparent electrode TE1-1 and the (2-1)-th transparent electrode TE2-1.

When the display device DD according to an embodiment of the present inventive concept operates in the first mode, a first switch S1 may be closed, so that the first transparent electrode TE1, the second transparent electrode TE2, and the first power V1 may be electrically connected to form a closed circuit. In the first mode, an electric field may be generated between the first transparent electrode TE1 and the second transparent electrode TE2. In the first mode, since the electric field is formed between the first transparent electrode TE1 and the second transparent electrode TE2, the liquid crystal molecules LC1 and LC2 may be aligned to have a certain direction.

In a state where the liquid crystal molecules LC1 and LC2 are aligned to have a certain direction, light heading to the first control pattern CP1 and light heading to the second control pattern CP2 may pass through the first control pattern CP1 and the second control pattern CP2, respectively. For example, side-surface light L-S heading to each of the first control pattern CP1 and the second control pattern CP2 from the light-emitting element ED may pass through the control pattern CP to head to an upper part of the display device DD. When the display device DD according to an embodiment of the present inventive concept operates in the first mode, front-surface light L-F and the side-surface light L-S, generated from the light-emitting element ED, may each head to the upper part of the display device DD. Accordingly, in the first mode, the display device DD may operate to have a wide viewing angle.

Referring to FIGS. 7 and 9B, when the display device DD according to an embodiment of the present inventive concept operates in the second mode, the first switch S1 may be opened, so that the electrical connection between the first transparent electrode TE1, the second transparent electrode TE2, and the first power V1 may be released. Accordingly, an open circuit, in which the first power V1 is not provided to the first transparent electrode TE1 and the second transparent electrode TE2, may be formed. In the second mode, an electric field might not be generated between the first transparent electrode TE1 and the second transparent electrode TE2. In the second mode, since an electric field is not generated between the first transparent electrode TE1 and the second transparent electrode TE2, liquid crystal molecules LC1' and LC2' may be randomly disposed without a certain direction.

In a state where the liquid crystal molecules LC1' and LC2' do not have a certain direction, light heading to the first control pattern CP1 and light heading to the second control pattern CP2 might not pass through the first control pattern CP1 and the second control pattern CP2, respectively. For example, the side-surface light L-S1 heading to each of the first control pattern CP1 and the second control pattern CP2 from the light-emitting element ED might not pass through the control pattern CP and might not head to the upper part of the display device DD. The side-surface light L-S1 heading to each of the first control pattern CP1 and the second control pattern CP2 may be scattered by the liquid crystal molecules LC1' and LC2' which are randomly disposed without a direction, and thus, the side-surface light L-S1 might not pass through the control pattern CP. When the display device DD according to an embodiment of the present inventive concept operates in the second mode, the front-surface light L-F, generated from the light-emitting element ED, may head to the upper part of the display device DD, but the side-surface light L-S1 may be scattered by each of the first control pattern CP1 and the second control pattern CP2, and thus, the side-surface light L-S1 might not head to the upper part of the display device DD. Accordingly, in the second mode, the display device DD may operate with a narrow viewing angle.

The display device DD, according to an embodiment of the inventive concept, may include the control pattern CP overlapping at least the non-light-emitting region NPXA and including the polymer that disperses liquid crystal, and may thus operate selectively in any one among the first mode, in which a screen is displayed at the wide viewing angle, and the second mode, in which the screen is displayed with the narrow viewing angle. In addition, the display device according to an embodiment of the present inventive concept may provide an image without deterioration of resolution even when it is switched to a mode with a different viewing mode.

According to a comparative example, a typical display device has a light-blocking pattern structure formed to overlap or to be adjacent to some pixels (or light-emitting elements) to operate selectively in any one among the first mode, in which the screen is displayed at a first viewing angle, and the second mode, in which the screen is displayed at a second viewing angle narrower than the first viewing angle. In this case, due to the light-blocking pattern, the side-surface brightness was decreased also in the first mode, and in each mode, only some pixels (or light-emitting elements) operate, causing deterioration of the resolution of the display device. In the display device DD according to an embodiment of the present inventive concept, the control pattern CP, which includes the polymer that disperses liquid crystal is provided without a partitioning structure of the pixels (or light-emitting element), so that in the first mode in which the screen is displayed at the wide viewing angle, the side-surface light may pass through the control pattern CP, and in the second mode in which the screen is displayed at the narrow viewing angle, the side-surface light might not pass through the control pattern CP and may be scattered. Therefore, it may be possible to provide a display device capable of operating selectively in the modes with different viewing angles without decreased side-surface brightness and resolution.

Figure 10:
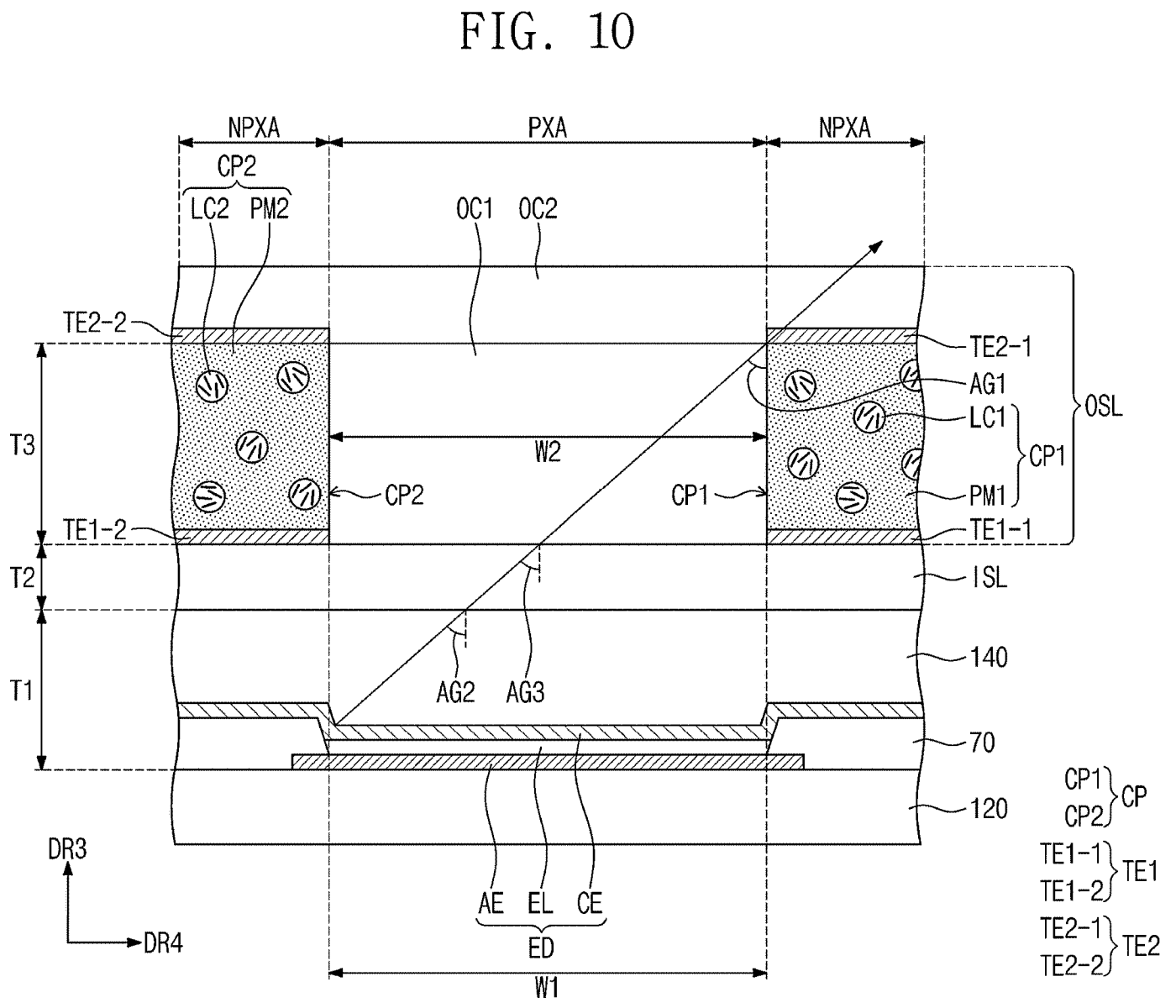

FIG. 10 is a cross-sectional view of a display device according to an embodiment of the present inventive concept. FIG. 10 particularly illustrates the thickness of each layer, the width of each component, the angle between the components, and the like on the cross section illustrated in FIG. 9B.

Referring to FIGS. 7, and 9A to 10, the combined thickness of the control pattern CP and the first transparent electrode TE1 may have a third thickness T3 in a third direction DR3 that is the thickness direction. In addition, the third thickness T3 may correspond to a distance from an upper surface of the input sensor ISL to an upper surface of the control pattern CP. The filling pattern OC1 may have the third thickness T3. Accordingly, an upper surface of the filling pattern OC1 and the upper surface of the control pattern CP may provide one flat surface. For example, the upper surface of the filling pattern OC1, an upper surface of the first control pattern CP1, and an upper surface of the second control pattern CP2 may be substantially parallel to each other.

In the display device according to an embodiment of the present inventive concept, a first width W1, which is the width of the light-emitting region PXA, may be substantially the same as a second width W2 that is a distance between the first control pattern CP1 and the second control pattern CP2. For example, the second width W2 that is the distance between the first control pattern CP1 and the second control pattern CP2 may correspond to the first width W1 that is the width of the opening 70-OP that is provided in the pixel-defining layer 70. In addition, in this specification, the meaning of "substantially the same" includes not only the case in which the width, the thickness, or the like is physically same, but also includes the case in which there is a difference within an error range which may occur during a manufacturing process despite the same design.

In the display device according to an embodiment of the present inventive concept, when the first width W1 and the second width W2 are the same, the third thickness T3 may be defined by Formula 1 below:

$$T3 = \tan(AG1)/(W1 - (T1 * \tan(AG2)) * (T2 * \tan(AG3)))) \quad \text{[Formula 1]}$$

In addition, as illustrated in FIG. 10, with respect to a virtual line extending from the upper left end (e.g., a corner) of the light-emitting element ED to the end (e.g., a corner) of the first control pattern CP1, AG1 in Formula 1 is the angle formed by the normal direction perpendicular to the upper surface of the filling pattern OC1 with respect to the virtual line. AG2 is the angle formed by the normal direction perpendicular to an upper surface of the encapsulation layer 140 with respect to the virtual line. AG3 is the angle formed by the normal direction perpendicular to the upper surface of the input sensor ISL with respect to the virtual line. T1 is the combined thickness of the light-emitting element layer 130 and the encapsulation layer 140 previously described. T2 is the thickness of the input sensor ISL. W1 is the width of the opening 70-OP provided in the pixel-defining layer 70.

In addition, unlike what is illustrated in FIG. 10, the first width W1 and the second width W2 may be different from each other. In a case that the first width W1 and the second width W2 are different from each other, the third thickness T3 may be defined by Formula 2 below:

$$T3 = (\tan(AG1)/W2) - ((\tan(AG2) + \tan(AG3))/W1) \quad \text{[Formula 2]}$$

The description for Formula 1 is equally applied to AG1, AG2, AG3, T1, and T2 in Formula 2.

In addition, when the thickness T2 of the input sensor ISL is about 0.6 μm, the refractive index of the input sensor ISL is about 1.82, the combined thickness T1 of the light-emitting element layer 130 and the encapsulation layer 140 is about 8 μm, the refractive index of the encapsulation layer 140 is about 1.55, the refractive index of the filling pattern OC1 is about 1.55, and the first width W1 and the second width W2 are the same are the same as each other, the third thickness T3 according to the target viewing angle and the first width W1 may have the values listed in Table 1 below. In addition, in Table 1, the "target viewing angle" corresponds to the second viewing angle, as previously described, where a user might not view the images at the angle exceeding the corresponding viewing angle when the display device operates in the second mode.

TABLE 1

| | Third thickness T3 | | |
|---|---|---|---|
| Target viewing angle | First width W1: 10 μm | First width W1: 13 μm | First width W1: 16 μm |
| 10° | 80 μm | 107 μm | 133 μm |
| 30° | 21 μm | 30 μm | 38 μm |
| 45° | 11 μm | 17 μm | 23 μm |

Figure 11:
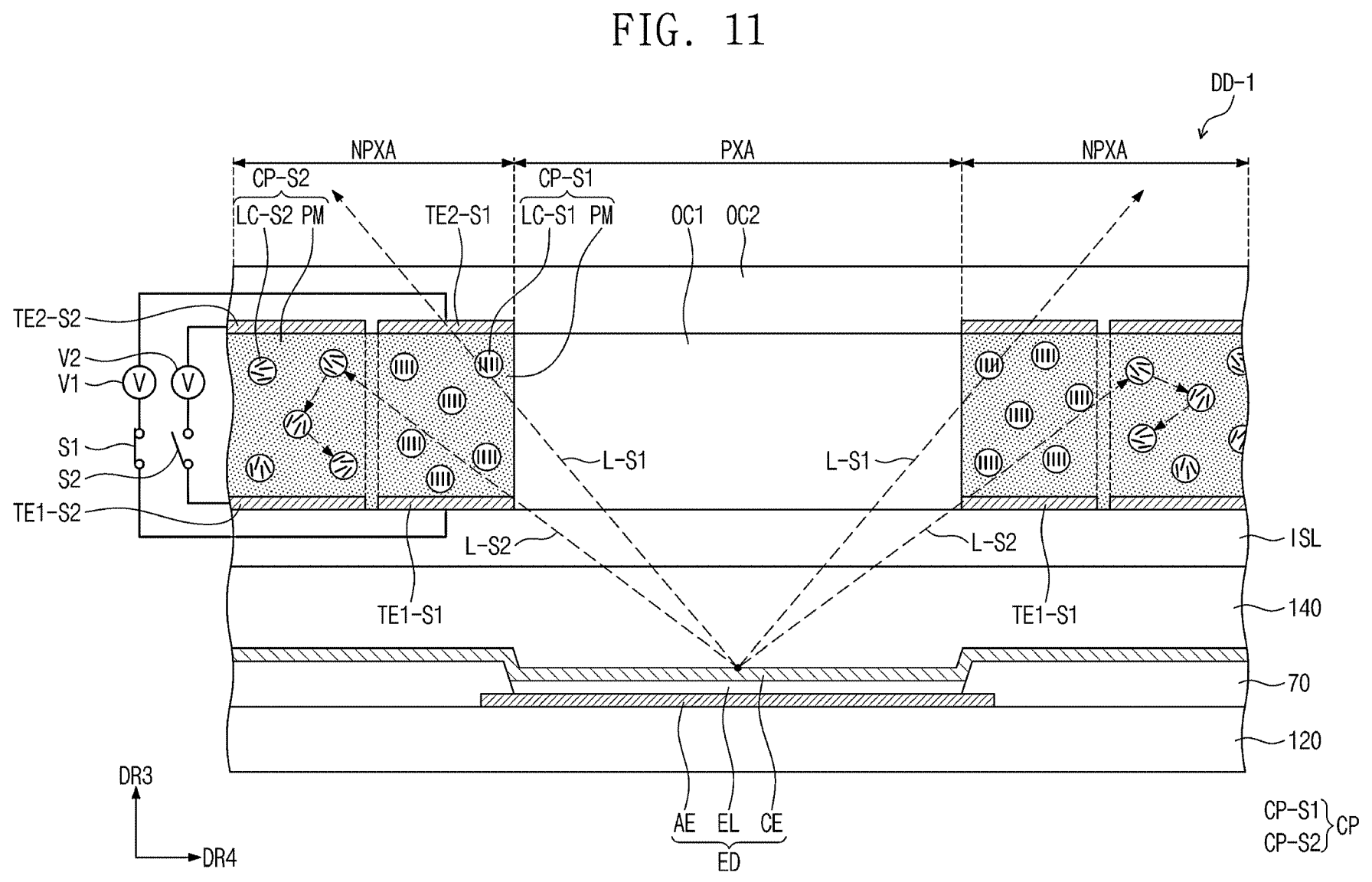

FIG. 11 is a cross-sectional view of a display device, according to an embodiment of the present inventive concept, which operates in a second mode. FIG. 11 illustrates a display device DD-1 according to an embodiment of the present inventive concept that is different from the display device according to the embodiment illustrated in FIGS. 9A and 9B.

Referring to FIGS. 7 and 11, in the light-path control layer OSL included in the display device DD according to an embodiment of the present inventive concept, the first transparent electrode TE1 and the second transparent electrode TE2 may each include a plurality of sub electrodes. The first transparent electrode TE1 may include a (1-1)-th sub electrode TE1-S1 and a (1-2)-th sub electrode TE1-S2 that are spaced apart from each other in one direction (for example, a fourth direction DR4). The second transparent electrode TE2 may include a (2-1)-th sub electrode TE2-S1 and a (2-2)-th sub electrode TE2-S2 that are spaced apart from each other in the one direction. The (2-1)-th sub electrode TE2-S1 may overlap the (1-1)-th sub electrode TE1-S1 on a plane, and the (2-2)-th sub electrode TE2-S2 may overlap the (1-2)-th sub electrode TE1-S2 on a plane.

Separate powers, different from each other, may be provided to the (1-1)-th sub electrode TE1-S1 and the (2-1)-th sub electrode TE2-S1, and to the (1-2)-th sub electrode TE1-S2 and the (2-2)-th sub electrode TE2-S2. A first power V1 may be provided to the (1-1)-th sub electrode TE1-S1 and the (2-1)-th sub electrode TE2-S1, and a second power V2 may be provided to the (1-2)-th sub electrode TE1-S2 and the (2-2)-th sub electrode TE2-S2. The (1-1)-th sub electrode TE1-S1, the (2-1)-th sub electrode TE2-S1, and the first power V1 may form a first circuit, the (1-2)-th sub electrode TE1-S2, the (2-2)-th sub electrode TE2-S2, and the second power V2 may form a second circuit, and the first circuit and the second circuit may operate separately from each other.

The control pattern CP may include a first part CP-S1 overlapping the (1-1)-th sub electrode TE1-S1 and the (2-1)-th sub electrode TE2-S1, and a second part CP-S2 overlapping the (1-2)-th sub electrode TE1-S2 and the (2-2)-th sub electrode TE2-S2. The first circuit, formed by the (1-1)-th sub electrode TE1-S1, the (2-1)-th sub electrode TE2-S1, and the first power V1, may determine whether the first part CP-S1 is aligned or not, and the second circuit, formed by the (1-2)-th sub electrode TE1-S2, the (2-2)-th sub electrode TE2-S2, and the second power V2, may determine whether the second part CP-S2 is aligned or not. In addition, the first part CP-S1 and the second part CP-S2 may have an integrated shape without being separated. For example, a separate interface might not exist between the first part CP-S1 and the second part CP-S2.

Since the first circuit and the second circuit, previously described, are separately driven, the display device DD-1, according to the embodiment illustrated in FIG. 11, may operate in a first mode, a second mode, and a third mode. FIG. 11 illustrates a cross section of the display device DD-1 which operates in the second mode.

When the display device DD-1, according to an embodiment of the present inventive concept, operates in the first mode, both of a first switch S1 and a second switch S2 may be in a closed state. Accordingly, the (1-1)-th sub electrode TE1-S1, the (2-1)-th sub electrode TE2-S1, and the first power V1 may be electrically connected to each other, so that the first circuit may become a closed circuit, and the (1-2)-th sub electrode TE1-S2, the (2-2)-th sub electrode TE2-S2, and the second power V2 may be electrically connected to each other, so that the second circuit may become a closed circuit. In the first mode, an electric field may be generated between the (1-1)-th sub electrode TE1-S1 and the (2-1)-th sub electrode TE2-S1, and between the (1-2)-th sub electrode TE1-S2 and the (2-2)-th sub electrode TE2-S2. In the first mode, the electric field may be formed between the (1-1)-th sub electrode TE1-S1 and the (2-1)-th sub electrode TE2-S1, and between the (1-2)-th sub electrode TE1-S2 and the (2-2)-th sub electrode TE2-S2, so that first liquid crystal molecules LC-S1 of the first part CP-S1 and second liquid crystal molecules LC-S2 of the second part CP-S2 may each be aligned to have a certain direction.

In a state where each of the first liquid crystal molecules LC-S1 and the second liquid crystal molecules LC-S2 are aligned to have a certain direction, light heading to the first part CP-S1 and light heading to the second part CP-S2 may pass through the first part CP-S1 and the second part CP-S2, respectively. For example, first side-surface light L-S1 heading to the first part CP-S1 from the light-emitting element ED and second side-surface light L-S2 heading to the second part CP-S2 from the light-emitting element ED may each pass through the control pattern CP to head to an upper part of the display device DD-1. When the display device DD-1 according to an embodiment of the present inventive concept operates in the first mode, a front-surface light L-F, the first side-surface light L-S1, and the second side-surface light L-S2 generated from the light-emitting element ED may each head to the upper part of the display device DD-1. Accordingly, in the first mode, the display device DD-1 may operate to have the widest viewing angle.

When the display device DD-1 according to an embodiment of the present inventive concept operates in the second mode, the first switch S1 may be in a closed state, and the second switch S2 may be in an opened state. Accordingly, the (1-1)-th sub electrode TE1-S1, the (2-1)-th sub electrode TE2-S1, and the first power V1 may be electrically connected, so that the first circuit becomes a closed circuit, and the (1-2)-th sub electrode TE1-S2, the (2-2)-th sub electrode TE2-S2, and the second power V2 may be electrically disconnected, so that the second circuit may become an open circuit. In the second mode, an electric field may be generated between the (1-1)-th sub electrode TE1-S1 and the (2-1)-th sub electrode TE2-S1, and an electric field might not be generated between the (1-2)-th sub electrode TE1-S2 and the (2-2)-th sub electrode TE2-S2. In the second mode, since the electric field is formed only between the (1-1)-th sub electrode TE1-S1 and the (2-1)-th sub electrode TE2-S1, the first liquid crystal molecules LC-S1 of the first part CP-S1 may be aligned to have a certain direction. Since the electric field is not formed between the (1-2)-th sub electrode TE1-S2 and the (2-2)-th sub electrode TE2-S2, the second liquid crystal molecules LC-S2 of the second part CP-S2 may be randomly disposed without a certain direction.

In a state where the first liquid crystal molecules LC-S1 are aligned to have a certain direction, the first side-surface light L-S1 heading to the first part CP-S1 may pass through the first part CP-S1. In a state where the second liquid crystal molecules LC-S2 don't have a certain direction, the second side-surface light L-S2 heading to the second part CP-S2 might not pass through the second part CP-S2. The second side-surface light L-S2, heading to the second part CP-S2, may be scattered by the second liquid crystal molecules LC-S2, which are randomly disposed without a certain direction, to thereby fail to pass through the control pattern CP. When the display device DD-1 according to an embodiment of the present inventive concept operates in the second mode, the front-surface light L-F and the first side-surface light L-S1, generated from the light-emitting element ED, may head to the upper part of the display device DD-1, but the second side-surface light L-S2 may be scattered by the second part CP-S2 of the control pattern CP to thereby fail to head to the upper part of the display device DD-1. Accordingly, in the second mode, the display device DD-1 may operate to have a medium viewing angle that is narrower than that of the first mode.

When the display device DD-1 according to an embodiment of the present inventive concept operates in the third mode, the first switch S1 and the second switch S2 may each be in an opened state. Accordingly, the (1-1)-th sub electrode TE1-S1, the (2-1)-th sub electrode TE2-S1, and the first power V1 may be electrically disconnected from each other, and the (1-2)-th sub electrode TE1-S2, the (2-2)-th sub electrode TE2-S2, and the second power V2 may be electrically disconnected from each other, so that the first circuit and the second circuit may each become an open circuit. In the third mode, an electric field might not be generated between the (1-1)-th sub electrode TE1-S1 and the (2-1)-th sub electrode TE2-S1, and between the (1-2)-th sub electrode TE1-S2 and the (2-2)-th sub electrode TE2-S2. In the third mode, since the electric field is not formed between the (1-1)-th sub electrode TE1-S1 and the (2-1)-th sub electrode TE2-S1, and between the (1-2)-th sub electrode TE1-S2 and the (2-2)-th sub electrode TE2-S2, the first liquid crystal molecules LC-S1 of the first part CP-S1 and the second liquid crystal molecules LC-S2 of the second part CP-S2 may each be randomly disposed without a certain direction.

In a state where the first liquid crystal molecules LC-S1 do not have a certain direction, the first side-surface light L-S1 heading to the first part CP-S1 might not pass through the first part CP-S1. In a state where the second liquid crystal molecules LC-S2 do not have a certain direction, the second side-surface light L-S2 heading to the second part CP-S2 might not pass through the second part CP-S2. The first side-surface light L-S1, heading to the first part CP-S1, may be scattered by the first liquid crystal molecules LC-S1, which are randomly disposed without a direction, to thereby fail to pass through the control pattern CP. The second side-surface light L-S2, heading to the second part CP-S2, may be scattered by the second liquid crystal molecules LC-S2, which are randomly disposed without a direction, to thereby fail to pass through the control pattern CP. When the display device DD-1 according to an embodiment of the present inventive concept operates in the third mode, the front-surface light L-F, generated from the light-emitting element ED, may head to the upper part of the display device DD-1, but the first side-surface light L-S1 may be scattered by the first part CP-S1 of the control pattern CP and the second side-surface light L-S2 may be scattered by the second part CP-S2 of the control pattern CP to thereby fail to head to the upper part of the display device DD-1.

Accordingly, in the third mode, the display device DD-1 may operate to have the narrowest viewing angle compared to those of the first mode and the second mode. The first transparent electrode TE1 and the second transparent electrode TE2 may each include a plurality of sub electrodes, and may have the first circuit and the second circuit which are driven separately from each other, and thus, the display device DD-1 according to an embodiment of the present inventive concept may operate selectively in at least three display modes having different viewing angles.

In addition, FIG. 11 illustrates that the first transparent electrode TE1 and the second transparent electrode TE2 of the display device DD-1, according to an embodiment of the present inventive concept, may each include two sub electrodes, and may thus have two circuits separately driven, but an embodiment of the present inventive concept is not limited thereto. For example, the first transparent electrode TE1 and the second transparent electrode TE2 of the display device DD-1 may each include at least three sub electrodes, and may also have at least three circuits.

Figure 12A:
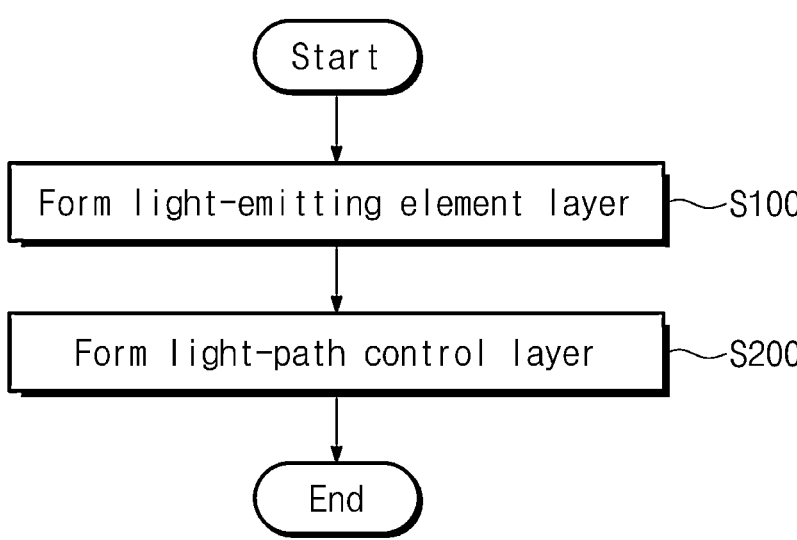
FIG. 12A is a flowchart of a manufacturing method of a display device according to an embodiment of the present inventive concept.
Figure 12B:
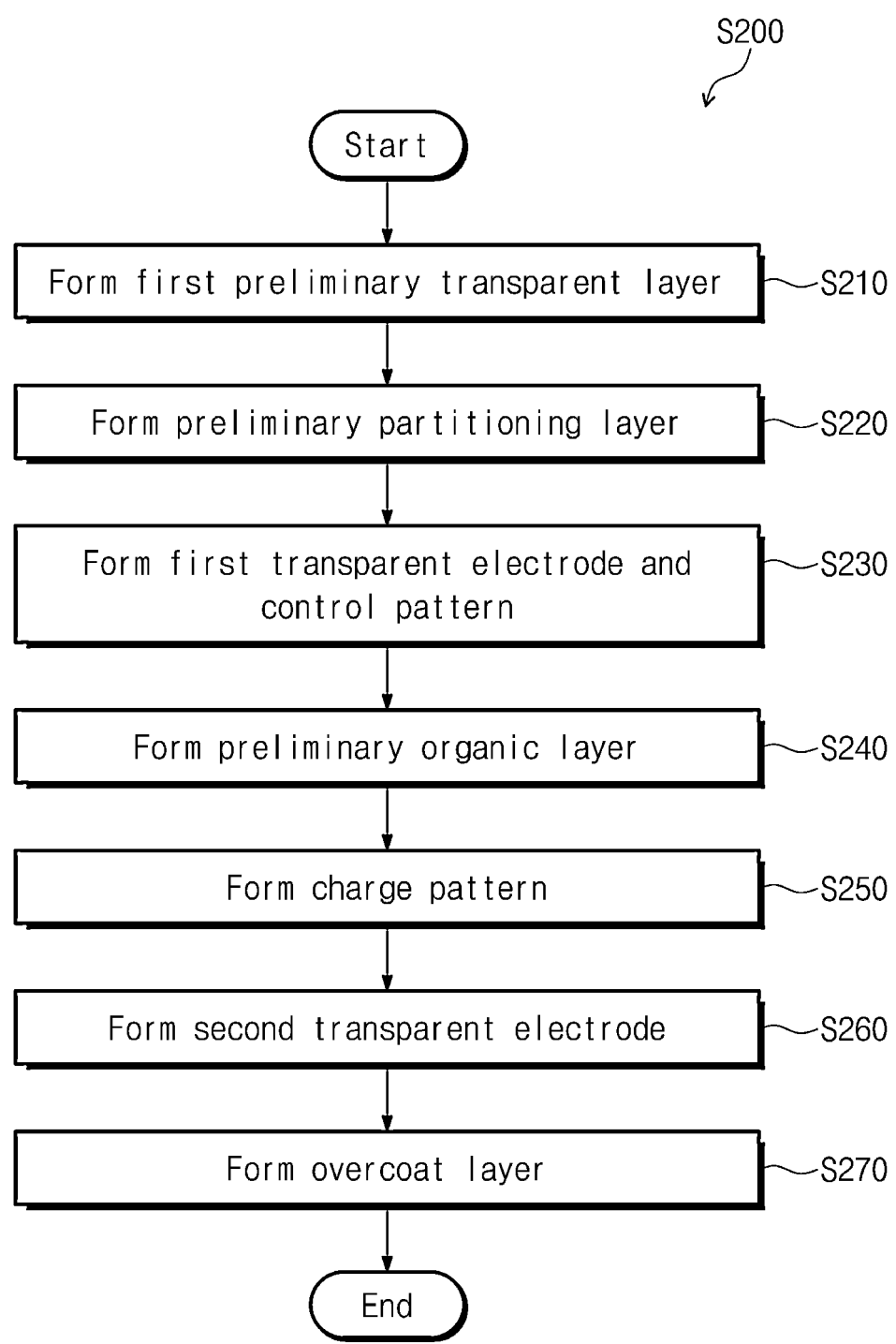
FIG. 12B is a flowchart of some steps of a manufacturing method of a display device according to an embodiment of the present inventive concept.

FIG. 12A is a flowchart of a manufacturing method of a display device according to an embodiment of the present inventive concept. FIG. 12B is a flowchart of some steps of the manufacturing method of the display device according to an embodiment of the present inventive concept. FIGS. 13A to 13E are cross-sectional views illustrating some steps of the manufacturing method of the display device according to an embodiment of the present inventive concept. Hereinafter, in describing the manufacturing method of the display device according to an embodiment of the present inventive concept with reference to FIGS. 12A to 13E, same/similar components described with reference to FIGS. 1A to 11 will be denoted as the same/similar reference numerals or symbols, and duplicate description will be omitted or briefly discussed.

Referring to FIG. 12A, the manufacturing method of the display device according to an embodiment of the present inventive concept includes forming a light-emitting element layer (S100) and forming a light-path control layer on the light-emitting element layer (S200). Referring to FIG. 12B, the step of forming the light-path control layer (S200) includes forming a first preliminary transparent layer through a conductive material (S210). The step (S200) further includes providing a polymer dispersed liquid crystal to the first preliminary transparent layer to form a preliminary partitioning layer (S220), and patterning the first preliminary transparent layer and the preliminary partitioning layer to form a first transparent electrode and a control pattern (S230). The step (S200) additionally includes providing an organic material onto the control pattern to form a preliminary organic layer (S240), and polishing the preliminary organic layer to form a filling pattern (S250). In addition, the step (S200) includes forming a second transparent electrode on the control pattern through a conductive material (S260), and forming an overcoat layer covering the second transparent electrode and the filling pattern (S270).

Figure 13A:
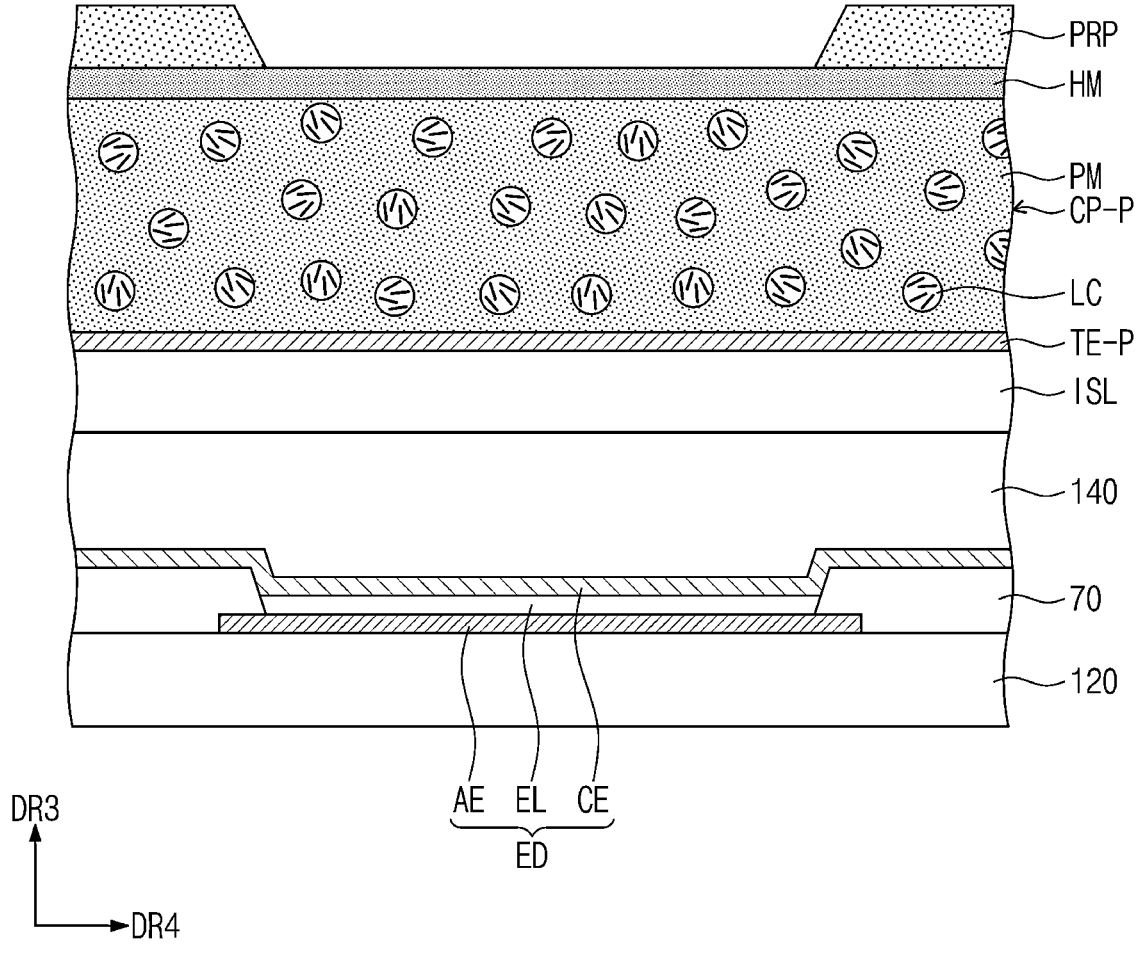
FIGS. 13A, 13B, 13C, 13D, and 13E are cross-sectional views illustrating some steps of a manufacturing method of a display device according to an embodiment of the present inventive concept.

Referring to FIGS. 12B and 13A together, the step of forming the light-path control layer, in the manufacturing method of the display device according to an embodiment of the present inventive concept, includes the step of forming the first preliminary transparent layer TE-P through a conductive material (S210), and the step of providing the polymer dispersed liquid crystal onto the first preliminary transparent layer TE-P to form the preliminary partitioning layer CP-P (S220).

The first preliminary transparent layer TE-P may be formed of an optically transparent conductive material. The first preliminary transparent layer TE-P may be formed of a transparent conductive oxide (TCO). For example, the first preliminary transparent layer TE-P may be formed of indium tin oxide (ITO).

The preliminary partitioning layer CP-P is formed on the first preliminary transparent layer TE-P, and includes the polymer that disperses liquid crystal. The preliminary partitioning layer CP-P includes a plurality of liquid crystal molecules LC and a polymer PM in which the plurality of liquid crystal molecules LC are dispersed. The preliminary partitioning layer CP-P may be formed in layers by applying a material including the polymer that disperses liquid crystal through a printing process, etc. The preliminary partitioning layer CP-P may be formed by curing the applied material including the polymer that disperses liquid crystal.

The polymer PM may be a dispersion medium which disperses the liquid crystal molecules LC therein, and may be a curable polymer that hardens by heat or light. The polymer PM may be, for example, an ultraviolet curable polymer. The plurality of liquid crystal molecules LC may be dispersed in the polymer PM, and each of the plurality of liquid crystal molecules LC may have a spherical shape. In the preliminary partitioning layer CP-P, the ratio of a weight of the plurality of liquid crystal molecules LC to a weight of the polymer PM may be about 80 to about 120 weight of the weight of the plurality of liquid crystal molecules LC to about 100 weight of the polymer PM.

Figure 13B:
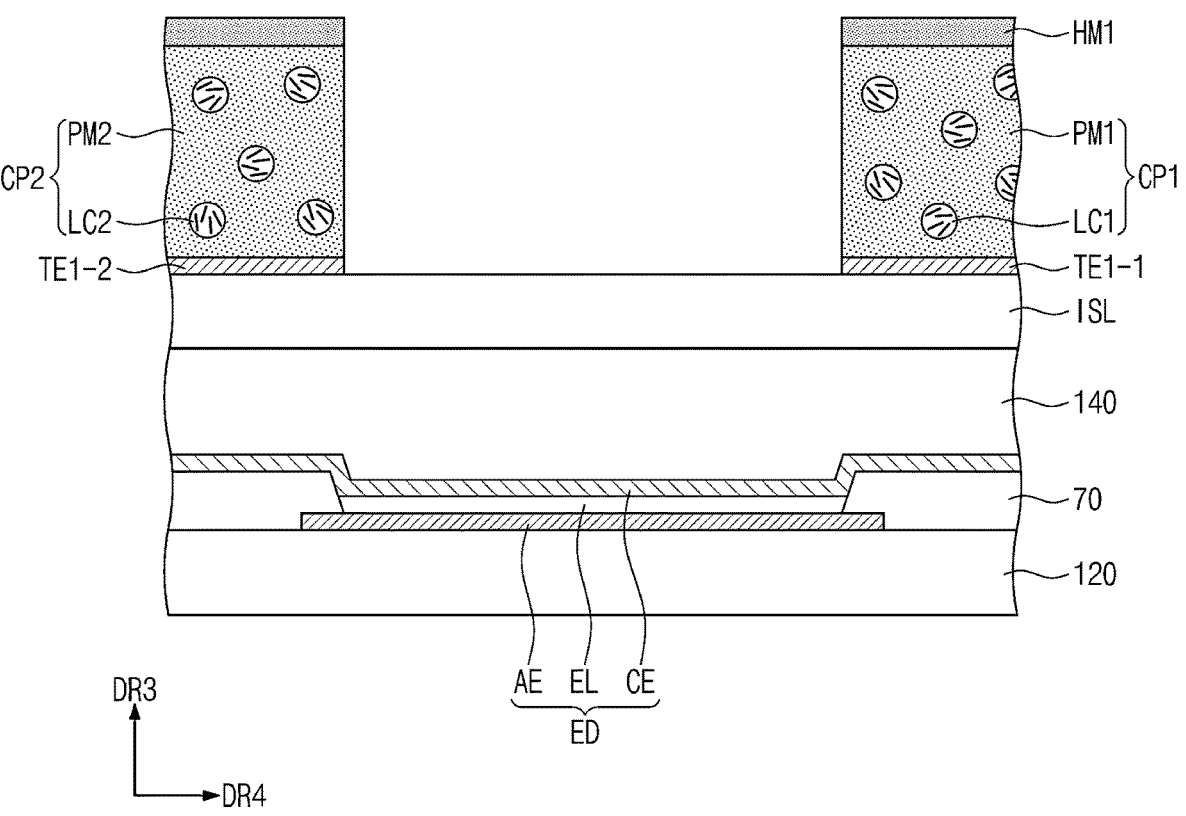

Referring to FIGS. 12B, 13A, and 13B together, the step of forming the light-path control layer, in the manufacturing method of the display device according to an embodiment of the present inventive concept, includes the step of patterning the first preliminary transparent layer TE-P and the preliminary partitioning layer CP-P to form the first transparent electrodes TE1-1 and TE1-2 and the control patterns CP1 and CP2 (S230).

The control patterns CP1 and CP2 may be formed by patterning the preliminary partitioning layer CP-P through a dry etch process. In the process of etching the preliminary partitioning layer CP-P, a photoresist pattern PRP may be used as a mask. In the process of etching the preliminary partitioning layer CP-P, a preliminary hard mask HM may also be etched together to form a hard mask HM1.

The first transparent electrodes TE1-1 and TE1-2 may be formed by patterning the first preliminary transparent layer TE-P through a wet etch process. In the process of etching the first preliminary transparent layer TE-P, the hard mask HM1 may be used as a mask. After the first preliminary transparent layer TE-P is etched to form the first transparent electrodes TE1-1 and TE1-2, the hard mask HM1 may be removed.

The control patterns CP1 and CP2 may include a first control pattern CP1 and a second control pattern CP2 that are spaced apart from each other along one direction (for example, a fourth direction DR4). Since a portion of the preliminary partitioning layer CP-P is removed, the first control pattern CP1 and the second control pattern CP2 may be formed to be spaced apart from each other.

The first transparent electrodes TE1-1 and TE1-2 may include a (1-1)-th transparent electrode TE1-1, which is disposed under the first control pattern CP1, and a (1-2)-th transparent electrode TE1-2, which is disposed under the second control pattern CP2. Since a portion of the first preliminary transparent layer TE-P is removed, the (1-1)-th transparent electrode TE1-1 and the (1-2)-th transparent electrode TE1-2 may be formed to be spaced apart from each other.

Figure 13C:
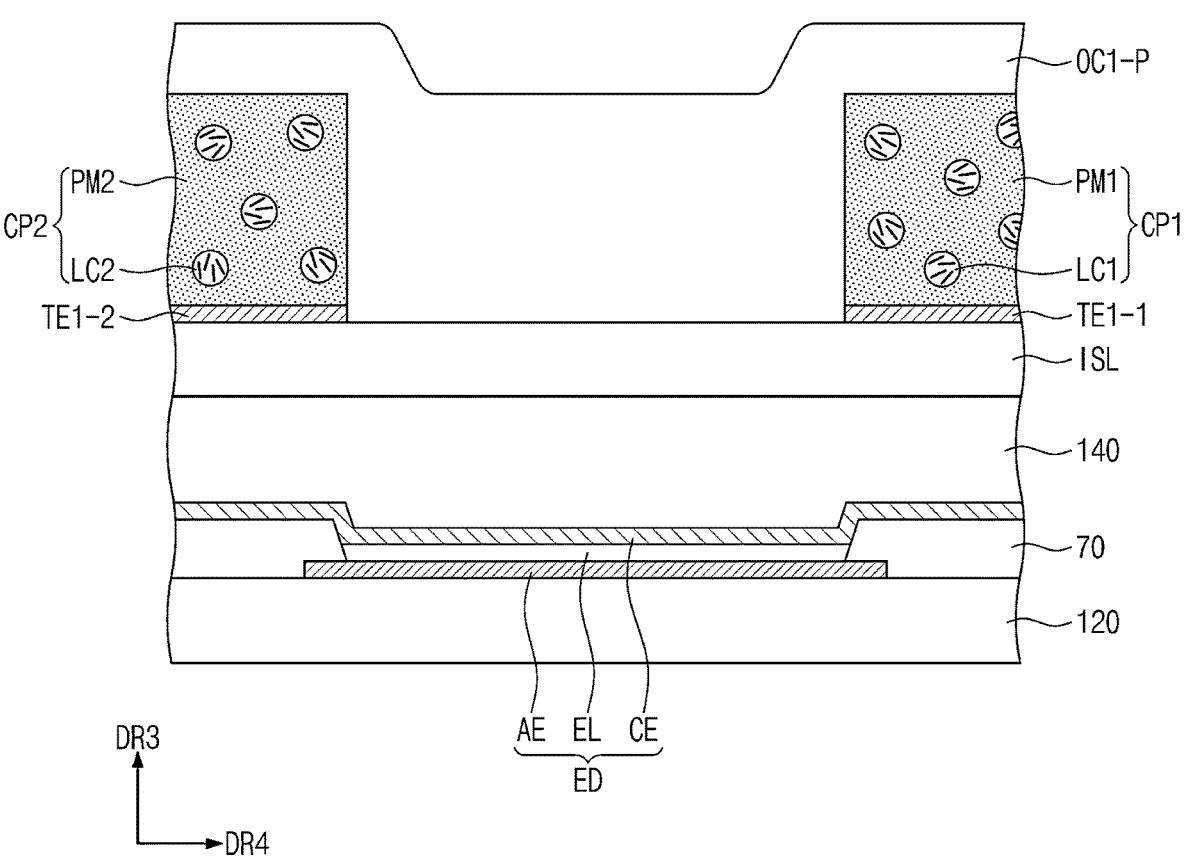

Referring to FIGS. 12B, 13B, and 13C together, the step of forming the light-path control layer, in the manufacturing method of the display device according to an embodiment of the present inventive concept, includes the step of providing an organic material onto the control patterns CP1 and CP2 to form the preliminary organic layer OC1-P (S240).

The preliminary organic layer OC1-P may be formed of an optically transparent organic material. The preliminary organic layer OC1-P may be formed to fill at least a portion of the space that is between first control pattern CP1 and the second control pattern CP2. A portion of the preliminary organic layer OC1-P may be formed above each of the first control pattern CP1 and the second control pattern CP2. The preliminary organic layer OC1-P may be formed to be in contact with an upper surface of an input sensor ISL.

Figure 13D:
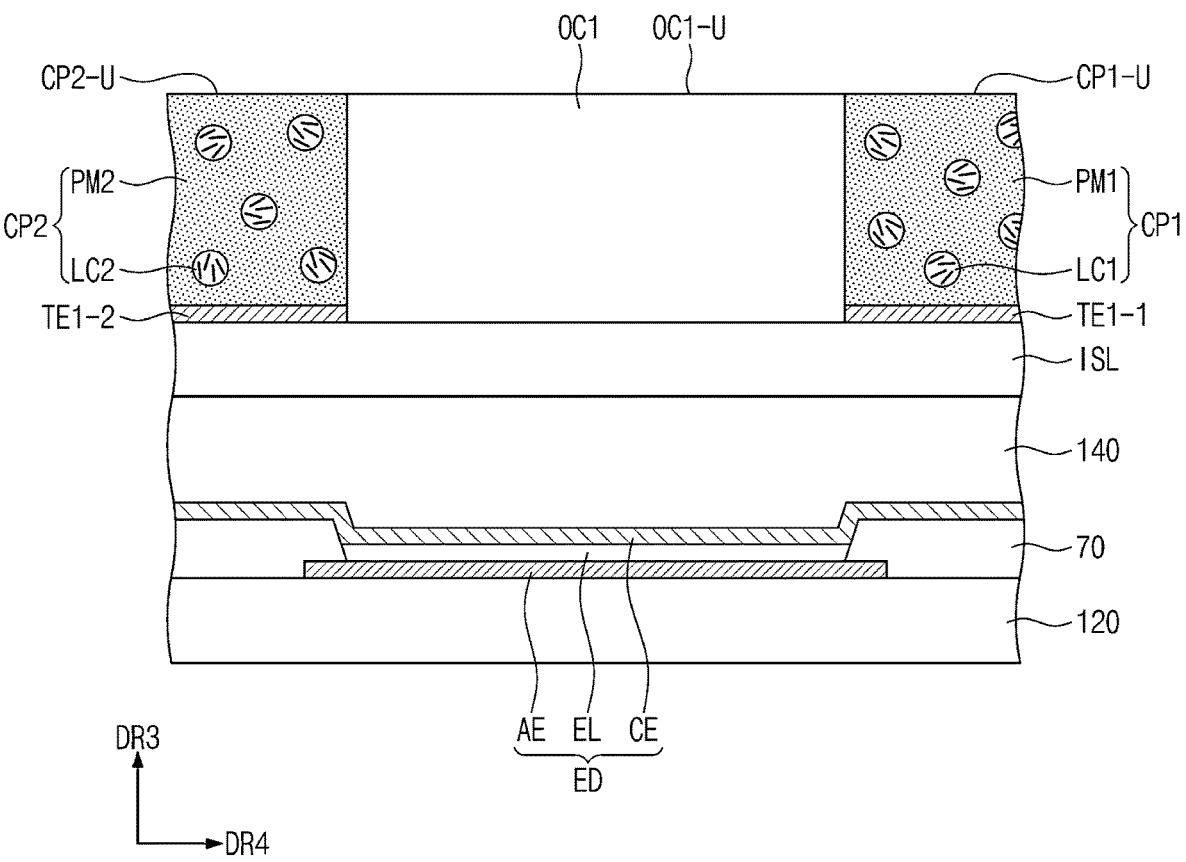

Referring to FIGS. 12B, 13C, and 13D together, the step of forming the light-path control layer, in the manufacturing method of the display device according to an embodiment of the present inventive concept, includes the step of polishing the preliminary organic layer OC1-P to form the filling pattern OC1 (S250).

The preliminary organic layer OC1-P may be polished through a chemical mechanical polishing (CMP) process. A portion of the preliminary organic layer OC1-P may be etched through the chemical mechanical polishing process to thereby form the filling pattern OC1 having a flat upper surface.

In addition, in a state where the filling pattern OC1 is formed after the step of polishing, the upper surface OC1-U of the filling pattern OC1 and upper surfaces CP1-U and CP2-U of the control patterns CP1 and CP2 may define one flat surface. That is, the upper surface OC1-U of the filling pattern OC1, the upper surface CP1-U of the first control pattern CP1, and the upper surface CP2-U of the second control pattern CP2 may be provided side by side as the one flat surface.

Figure 13E:
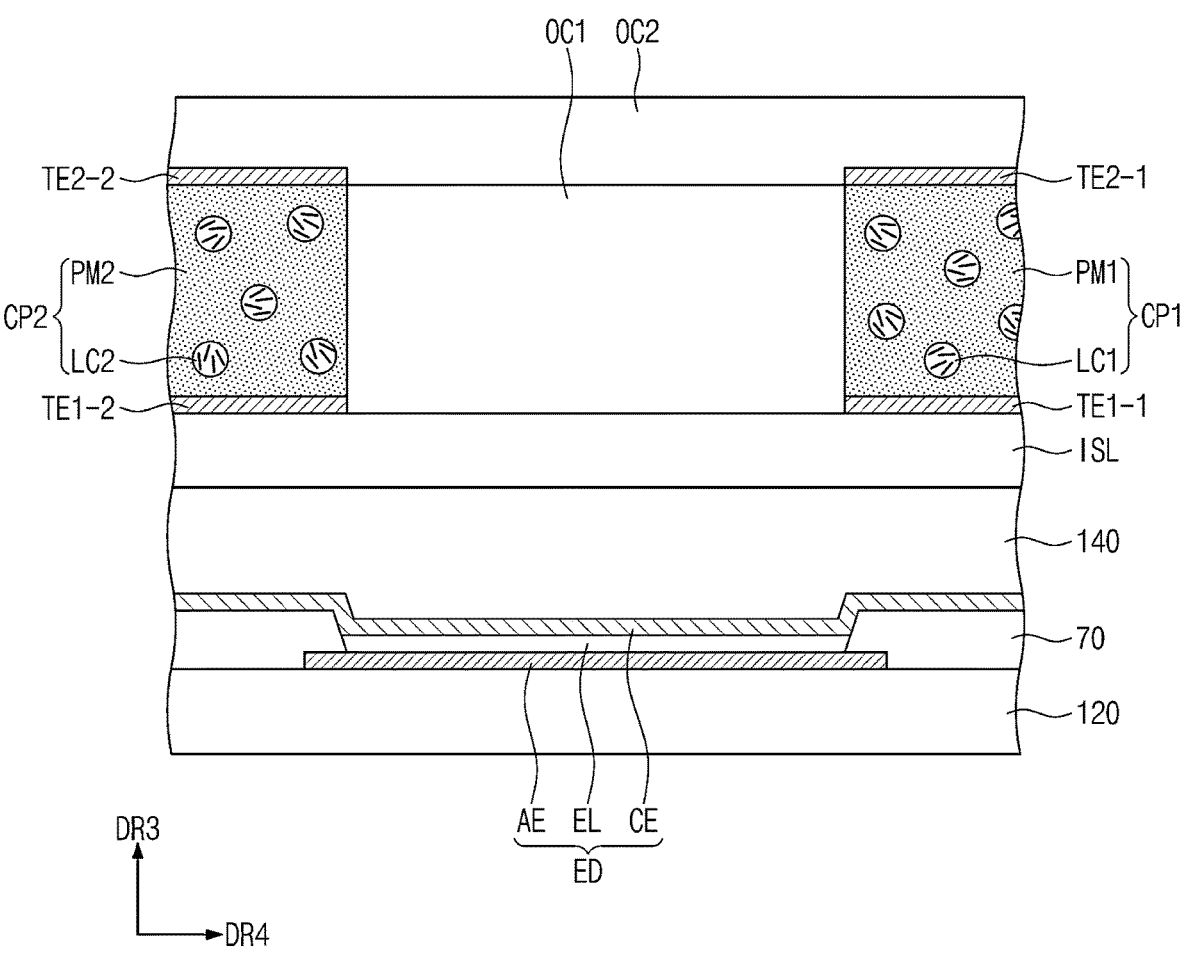

Referring to FIGS. 12B, 13D, and 13E together, the step of forming the light-path control layer, in the manufacturing method of the display device according to an embodiment of the present inventive concept, includes the step of forming the second transparent electrodes TE2-1 and TE2-2 on the control patterns CP1 and CP2 through a conductive material (S260), and the step of forming the overcoat layer OC2 covering the second transparent electrode TE2-1 and TE2-2 and the filling pattern OC1 (S270).

The second transparent electrodes TE2-1 and TE2-2 are formed on the control patterns CP1 and CP2. The second transparent electrodes TE2-1 and TE2-2 may include a (2-1)-th transparent electrode TE2-1 formed on the first control pattern CP1, and a (2-2)-th transparent electrode TE2-2 formed on the second control pattern CP2. In addition, after one common layer is formed above the control patterns CP1 and CP2 and the filling pattern OC1 through the conductive material, a portion of the common layer overlapping the filling pattern OC1 may be removed to form the second transparent electrodes TE2-1 and TE2-2 that are disposed above the control patterns CP1 and CP2.

The second transparent electrodes TE2-1 and TE2-2 may be formed of an optically transparent conductive material. The second transparent electrodes TE2-1 and TE2-2 may be formed of a transparent conductive oxide (TCO). For example, the second transparent electrodes TE2-1 and TE2-2 may be formed of indium tin oxide (ITO).

The overcoat layer OC2 may be formed on the filling pattern OC1 and the control patterns CP1 and CP2. The overcoat layer OC2 may be disposed on the second transparent electrodes TE2-1 and TE2-2. The overcoat layer OC2 may cover an upper part of the filling pattern OC1 and upper parts of the second transparent electrodes TE2-1 and TE2-2. For example, the overcoat layer OC2 may be directly formed on the filling pattern OC1 and the second transparent electrodes TE2-1 and TE2-2.

The overcoat layer OC2 may be formed on the filling pattern OC1, the control patterns CP1 and CP2, and the second transparent electrodes TE2-1 and TE2-2, and may protect the components disposed thereunder. In addition, the overcoat layer OC2 may remove a step difference to provide a flat upper surface.

The overcoat layer OC2 may include an optically transparent organic material. The overcoat layer OC2 may include the same material as that of the filling pattern OC1. In addition, the filling pattern OC1 and the overcoat layer OC2 may be formed through separate processes, and thus, a visible boundary surface may be formed between the filling pattern OC1 and the overcoat layer OC2.

According to an embodiment of the present inventive concept, it may be possible to provide, according to a user's choice or a predetermined regulation, a display device which operates in a mode where the viewing angle is limited, and in a mode where the viewing angle is not limited.

According to an embodiment of the present inventive concept, it may be possible to provide a display device which operates selectively in modes with different viewing angles without decreased side-surface brightness and resolution.

While the present inventive concept has been described with reference to embodiments thereof, it will be understood by those of ordinary skill in the art that various changes in form and details may be made thereto without departing from the spirit and scope of the present inventive concept.

What is claimed is:

1. A display device comprising:
   a light-emitting element layer including a light-emitting region and a non-light-emitting region adjacent to the light-emitting region; and
   a light-path control layer disposed on the light-emitting element layer, and configured to control a path of light that is provided from the light-emitting element layer, wherein the light-path control layer includes a control pattern that overlaps the non-light-emitting region and does not overlap the light-emitting region, wherein the control pattern includes a polymer and liquid crystal molecules that are dispersed within the polymer.

2. The display device of claim 1, wherein the control pattern comprises a first control pattern and a second control pattern that are spaced apart from each other with the light-emitting region therebetween.

3. The display device of claim 2, wherein the light-path control layer further comprises:
   a filling pattern disposed between the first control pattern and the second control pattern; and
   an overcoat layer disposed on the first control pattern, the second control pattern, and the filling pattern.

4. The display device of claim 3, wherein the filling pattern is in contact with each of a side surface of the first control pattern and a side surface of the second control pattern.

5. The display device of claim 3, wherein an upper surface of the first control pattern, an upper surface of the second control pattern, and an upper surface of the filling pattern are substantially coplanar.

6. The display device of claim 2, wherein a distance between the first control pattern and the second control pattern is substantially equal to a width of the light-emitting region.

7. The display device of claim 1, wherein the light-path control layer further comprises a first transparent electrode disposed on the control pattern, and a second transparent electrode spaced apart from the first transparent electrode in a thickness direction with the control pattern disposed therebetween.

8. The display device of claim 7, wherein the display device is configured to operate selectively in a first mode or a second mode, in the first mode, a first voltage is applied to the first transparent electrode and the second transparent electrode, and in the second mode, the first voltage is not applied to the first transparent electrode and the second transparent electrode.

9. The display device of claim 8, wherein in the first mode, the control pattern transmits the light provided from the light-emitting element layer, and in the second mode, the control pattern scatters the light provided from the light-emitting element layer.

10. The display device of claim 7, wherein the first transparent electrode comprises a (1-1)-th sub electrode and a (1-2)-th sub electrode that are spaced apart from each other, and the second transparent electrode comprises a (2-1)-th sub electrode, which overlaps the (1-1)-th sub electrode, and a (2-2)-th sub electrode, which overlaps the (1-2)-th sub electrode.

11. The display device of claim 10, wherein the display device is configured to operate selectively in one of a first mode, a second mode, or a third mode, in the first mode, a first voltage is applied to the (1-1)-th sub electrode and the (2-1)-th sub electrode, and a second voltage is applied to the (1-2)-th sub electrode and the (2-2)-th sub electrode, in the second mode, the first voltage is applied to the (1-1)-th sub electrode and the (2-1)-th sub electrode, and the second voltage is not applied to the (1-2)-th sub electrode and the (2-2)-th sub electrode, and in the third mode, the first voltage is not applied to the (1-1)-th sub electrode and the (2-1)-th sub electrode, and the second voltage is not applied to the (1-2)-th sub electrode and the (2-2)-th sub electrode.

12. The display device of claim 10, wherein the control pattern comprises a first part, which overlaps the (1-1)-th sub electrode, and a second part, which overlaps the (1-2)-th sub electrode, and the first part and the second part have an integrated shape.

13. The display device of claim 1, wherein the light-emitting element layer comprises:

a pixel-defining layer including a pixel opening that defines the light-emitting region; and a light-emitting layer at least partially disposed in the pixel opening and configured to provide the light, wherein the control pattern overlaps the pixel-defining layer.

14. The display device of claim 1, wherein the light-emitting region comprises a first light-emitting region configured to emit light of a first wavelength, a second light-emitting region configured to emit light of a second wavelength that is different from the first wavelength, and a third light-emitting region configured to emit light of a third wavelength that is different from each of the first wavelength and the second wavelength, and the control pattern overlaps each of a portion between the first light-emitting region and the second light-emitting region and a portion between the second light-emitting region and the third light-emitting region.

15. The display device of claim 1, further comprising an input sensor disposed between the light-path control layer and the light-emitting element layer.

16. The display device of claim 15, wherein the light-path control layer is directly disposed on the input sensor.

17. An electronic device comprising:

a display device, wherein the display device includes:

a light-emitting element layer including a light-emitting region and a non-light-emitting region at least partially surrounding the light-emitting region; and a light-path control layer disposed on the light-emitting element layer in the non-light-emitting region, and configured to control a path of light that is provided from the light-emitting element layer, wherein the light-path control layer includes:

a first transparent electrode disposed on the light-emitting element layer in the non-light-emitting region;

a control pattern disposed on the first transparent electrode in the non-light-emitting region and does not overlap the light-emitting region, and including a polymer and liquid crystal molecules that are dispersed within the polymer; and a second transparent electrode spaced apart from the first transparent electrode in a thickness direction with the control pattern disposed therebetween, wherein the first transparent electrode includes a (1-1)-th sub electrode and a (1-2)-th sub electrode that are spaced apart from each other, and the second transparent electrode includes a (2-1)-th sub electrode, which overlaps the (1-1)-th sub electrode, and a (2-2)-th sub electrode, which overlaps the (1-2)-th sub electrode.

18. The electronic device of claim 17, wherein the control pattern comprises a first part, which overlaps the (1-1)-th sub electrode, and a second part, which overlaps the (1-2)-th sub electrode, and the first part and the second part have an integrated shape.

19. A manufacturing method of a display device, comprising:

forming a light-emitting element layer including a light-emitting region and a non-light-emitting region adjacent to the light-emitting region; and forming a light-path control layer on the light-emitting element layer, wherein the forming of the light-path control layer includes:

forming a first preliminary transparent layer through a conductive material;

providing a polymer, in which liquid crystal molecules are dispersed, onto the first preliminary transparent layer to form a preliminary partitioning layer;

patterning the first preliminary transparent layer and the preliminary partitioning layer to form a first transparent electrode and a control pattern that overlaps the non-light-emitting region and does not overlap the light-emitting region;

providing an organic material onto the control pattern to form a preliminary organic layer;

polishing the preliminary organic layer to form a filling pattern;

forming a second transparent electrode on the control pattern through a conductive material; and forming an overcoat layer covering the second transparent electrode and the filling pattern.

20. The manufacturing method of claim 19, wherein in the forming of the filling pattern, an upper surface of each of the control pattern and the filling pattern is planarized by the polishing.

\* \* \* \* \*